United States Patent
Kazama

(10) Patent No.: US 11,258,960 B2
(45) Date of Patent: *Feb. 22, 2022

(54) IMAGING DEVICE, INFORMATION PROCESSING SYSTEM, PROGRAM, IMAGE PROCESSING METHOD

(71) Applicant: Ricoh Company, Ltd., Tokyo (JP)

(72) Inventor: Yasuhiro Kazama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 115 days.

This patent is subject to a terminal disclaimer.

(21) Appl. No.: 16/801,158

(22) Filed: Feb. 26, 2020

(65) Prior Publication Data

US 2020/0195858 A1     Jun. 18, 2020

Related U.S. Application Data

(63) Continuation of application No. 16/103,364, filed on Aug. 14, 2018, now Pat. No. 10,609,302.

(30) Foreign Application Priority Data

Aug. 30, 2017   (JP) .............................. JP2017-166054

(51) Int. Cl.
*H04N 5/243*   (2006.01)
*H04N 5/232*   (2006.01)
(Continued)

(52) U.S. Cl.
CPC ............. *H04N 5/243* (2013.01); *H04N 5/217* (2013.01); *H04N 5/2351* (2013.01);
(Continued)

(58) Field of Classification Search
CPC .. H04N 5/243; H04N 5/2351; H04N 5/23238; H04N 5/217; H04N 5/23293;
(Continued)

(56) References Cited

U.S. PATENT DOCUMENTS 9,258,453 B2    2/2016  Kato et al.
10,397,475 B2   8/2019  Jinno
(Continued)

FOREIGN PATENT DOCUMENTS

JP    2015-050498    3/2015
JP    2016-040879    3/2016
JP    2017-028633    2/2017

*Primary Examiner* — Shahbaz Nazrul
(74) *Attorney, Agent, or Firm* — Xsensus LLP

(57) ABSTRACT

An imaging device further includes a correction gain calculating unit configured to calculate a first correction gain of a first partial image captured by the first imaging element and calculate a second correction gain of a second partial image captured by the second imaging element based on the first exposure amount and the second exposure amount; a photographing processing unit configured to make an imaging element having a smaller one of the first exposure amount and the second exposure amount image with an exposure amount of the imaging element and makes an imaging element having a larger one of the first exposure amount and the second exposure amount image with the third exposure amount; and an image correction unit configured to correct the first partial image with the first correction gain and correct the second partial image with the second correction gain calculated by the correction gain calculating unit.

20 Claims, 19 Drawing Sheets

(51) Int. Cl.
    *H04N 5/347*    (2011.01)
    *H04N 5/235*    (2006.01)
    *H04N 5/217*    (2011.01)
    *H04N 9/73*     (2006.01)

(52) U.S. Cl.
    CPC ....... *H04N 5/2353* (2013.01); *H04N 5/23238* (2013.01); *H04N 5/23293* (2013.01); *H04N 5/23296* (2013.01); *H04N 5/347* (2013.01); *H04N 9/735* (2013.01)

(58) Field of Classification Search
    CPC .. H04N 5/347; H04N 5/2353; H04N 5/23296; H04N 9/735
    See application file for complete search history.

(56) References Cited

U.S. PATENT DOCUMENTS

| | | |
|---|---|---|
| 2002/0113881 A1 | 8/2002 | Funston et al. |
| 2009/0231465 A1 | 9/2009 | Senba |
| 2009/0290033 A1 | 11/2009 | Jones et al. |
| 2012/0268641 A1 | 10/2012 | Kazama |
| 2014/0078333 A1* | 3/2014 | Miao ................ H04N 5/23232 348/222.1 |
| 2014/0192214 A1* | 7/2014 | Laroia ..................... G02B 7/18 348/218.1 |
| 2015/0116538 A1 | 4/2015 | Terauchi et al. |
| 2016/0134817 A1 | 5/2016 | Yoshikawa |
| 2017/0032555 A1 | 2/2017 | Gingawa et al. |
| 2019/0124266 A1 | 4/2019 | Miyazawa |
| 2019/0243376 A1 | 8/2019 | Davis et al. |
| 2019/0335079 A1* | 10/2019 | Koizumi ............ H04N 5/35572 |
| 2020/0351432 A1* | 11/2020 | Rivard ................ H04N 5/2354 |

* cited by examiner

DIVIDE INTO 16

DIVIDE INTO 16

| AE EVALUATION VALUE | DELTA EV |
|---|---|
| 3680 | +3 |
| 1840 | +2 |
| 920 | +1 |
| 460 | ±0 |
| 230 | −1 |
| 115 | −2 |
| 58 | −3 | ism
IMAGING DEVICE, INFORMATION PROCESSING SYSTEM, PROGRAM, IMAGE PROCESSING METHOD

CROSS-REFERENCE TO RELATED APPLICATIONS

This patent application is a continuation of U.S. application Ser. No. 16/103,364, filed Aug. 14, 2018, which is based on and claims priority pursuant to 35 U.S.C. § 119(a) to Japanese Patent Application No. 2017-166054, filed on Aug. 30, 2017, in the Japan Patent Office, the entire disclosure of each is hereby incorporated by reference herein.

BACKGROUND

Technical Field

The present disclosure relates to an imaging device, an information processing system, a program, and an image processing method.

Background Art

An omnidirectional imaging device has been known that uses a plurality of wide-angle lenses such as a fisheye lens and a super wide-angle lens to capture a 360 degree omnidirectional image (referred to as omnidirectional below) by one image capturing operation. The omnidirectional imaging device forms an image of light that has passed through each lens on a sensor and couples the obtained partial images by image processing to generate an omnidirectional image. For example, the omnidirectional image can be generated by using two wide-angle lenses having an angle of view which exceeds 180 degrees.

In the above image processing, projection conversion is performed on the two partial images captured by the respective wide-angle lenses using a predetermined projection method. Since an image that has passed through the wide-angle lens is distorted, distortion correction is performed in consideration of the distortion at the time of the projection conversion. Then, image processing is performed in which the two partial images are joined together by using an overlapped region included in the partial images to generate one omnidirectional image.

SUMMARY

In one aspect of this disclosure, there is provided an improved imaging device that connects partial images obtained from a plurality of imaging elements and forms and outputs a single image, the imaging device including a first exposure amount calculating unit configured to determine a first exposure amount of a first imaging element from a signal output from the first imaging element; a second exposure amount calculating unit configured to determine a second exposure amount of a second imaging element from a signal output from the second imaging element; and a third exposure amount determining unit configured to make the larger one of the first exposure amount and the second exposure amount be smaller than an original value and determine a third exposure amount of an imaging element having the larger one of the first exposure amount and the second exposure amount. The imaging device further includes a correction gain calculating unit configured to calculate a first correction gain of a first partial image captured by the first imaging element and calculate a second correction gain of a second partial image captured by the second imaging element based on the first exposure amount and the second exposure amount; a photographing processing unit configured to make an imaging element having a smaller one of the first exposure amount and the second exposure amount image with an exposure amount of the imaging element and makes an imaging element having a larger one of the first exposure amount and the second exposure amount image with the third exposure amount; and an image correction unit configured to correct the first partial image with the first correction gain calculated by the correction gain calculating unit and correct the second partial image with the second correction gain calculated by the correction gain calculating unit.

In another aspect of this disclosure, there is provided an improved information processing system that connects partial images obtained from a plurality of imaging elements and forms and outputs a single image, the information processing system including a first exposure amount calculating unit configured to determine a first exposure amount of a first imaging element from a signal output from the first imaging element; a second exposure amount calculating unit configured to determine a second exposure amount of a second imaging element from a signal output from the second imaging element; a third exposure amount determining unit configured to make the larger one of the first exposure amount and the second exposure amount be smaller than an original value and determine a third exposure amount of an imaging element having the larger one of the first exposure amount and the second exposure amount. The information processing system further includes a correction gain calculating unit configured to calculate a first correction gain of a first partial image captured by the first imaging element and calculate a second correction gain of a second partial image captured by the second imaging element based on the first exposure amount and the second exposure amount; a photographing processing unit configured to make an imaging element having a smaller one of the first exposure amount and the second exposure amount image with an exposure amount of the imaging element and makes an imaging element having a larger one of the first exposure amount and the second exposure amount image with the third exposure amount; and an image correction unit configured to correct the first partial image with the first correction gain calculated by the correction gain calculating unit and correct the second partial image with the second correction gain calculated by the correction gain calculating unit.

In still another aspect of this disclosure, there is provided an improved non-transitory computer readable storage medium storing a program that causes an information processing device that connects partial images obtained from a plurality of imaging elements and forms and outputs a single image, the information processing system to function as: a first exposure amount calculating unit configured to determine a first exposure amount of a first imaging element from a signal output from the first imaging element; a second exposure amount calculating unit configured to determine a second exposure amount of a second imaging element from a signal output from the second imaging element; a third exposure amount determining unit configured to make the larger one of the first exposure amount and the second exposure amount be smaller than an original value and determine a third exposure amount of an imaging element having the larger one of the first exposure amount and the second exposure amount; a correction gain calculating unit configured to calculate a first correction gain of a first partial image captured by the first imaging element and calculate a second correction gain of a second partial image captured by the second imaging element based on the first exposure amount and the second exposure amount; a photographing processing unit configured to make an imaging element having a smaller one of the first exposure amount and the second exposure amount image with an exposure amount of the imaging element and makes an imaging element having a larger one of the first exposure amount and the second exposure amount image with the third exposure amount; and an image correction unit configured to correct the first partial image with the first correction gain calculated by the correction gain calculating unit and correct the second partial image with the second correction gain calculated by the correction gain calculating unit.

In still another aspect of this disclosure, there is provided an improved image processing method of an imaging device that connects partial images obtained from a plurality of imaging elements and forms and output a single image, the method including determining a first exposure amount of a first imaging element from a signal output from the first imaging element by a first exposure amount calculating unit; determining a second exposure amount of a second imaging element from a signal output from the second imaging element by a second exposure amount calculating unit; making the larger one of the first exposure amount and the second exposure amount be smaller than an original value and determining a third exposure amount of an imaging element having the larger one of the first exposure amount and the second exposure amount by a third exposure amount determining unit; calculating a first correction gain of a first partial image captured by the first imaging element and calculating a second correction gain of a second partial image captured by the second imaging element based on the first exposure amount and the second exposure amount by a correction gain calculating unit; making an imaging element having a smaller one of the first exposure amount and the second exposure amount image with an exposure amount of the imaging element and making an imaging element having a larger one of the first exposure amount and the second exposure amount image with the third exposure amount by a photographing processing unit; and correcting the first partial image with the first correction gain calculated by the correction gain calculating unit and correcting the second partial image with the second correction gain calculated by the correction gain calculating unit by an image correction unit.

BRIEF DESCRIPTION OF THE DRAWINGS

The aforementioned and other aspects, features, and advantages of the present disclosure will be better understood by reference to the following detailed description when considered in connection with the accompanying drawings, wherein.

DETAILED DESCRIPTION

Figure 1:
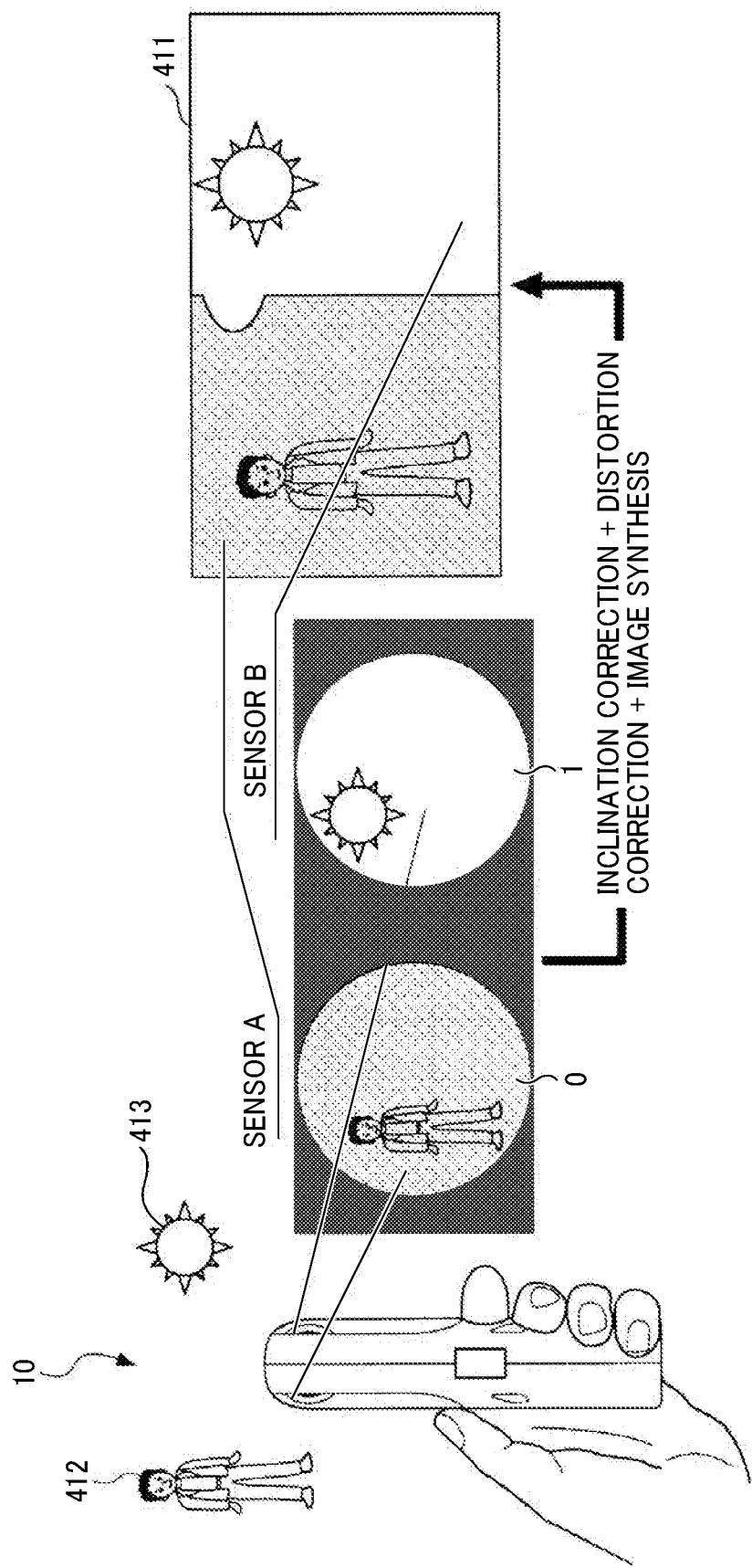
FIG. 1 is an exemplary diagram for schematically describing an exposure difference correcting technique.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Hereinafter, a description is given of several embodiments of the present disclosure with reference to the drawings.

First, before describing an exposure difference correcting technique according to the present embodiment, an example of a conventional exposure difference correcting technique and a disadvantage of the same will be complementally described.

FIG. 1 is a diagram for schematically describing an example of an exposure difference correcting technique. An omnidirectional imaging device 10 includes two photographing optical systems and obtains two partial images 0 and 1. In a photographing range of one of the photographing optical systems, a person 412 exists, and in a photographing range of the other photographing optical system, the sun 413 exists. For convenience of description, one photographing optical system is referred to as a sensor A, and the other photographing optical system is referred to as a sensor B. Furthermore, for easy understanding, the person and the sun with no distortion are illustrated in FIG. 1. However, the partial images include distortions according to a projecting method.

The omnidirectional imaging device connects the partial image 0 captured by the sensor A and the partial image 1 captured by the sensor B. Specifically, after inclination correction and distortion correction, two images are synthesized to create a synthesized image 411. This synthesis is referred to as "connection", and an exposure difference between the two partial images 0 and 1 are corrected before the connection.

Figure 2:
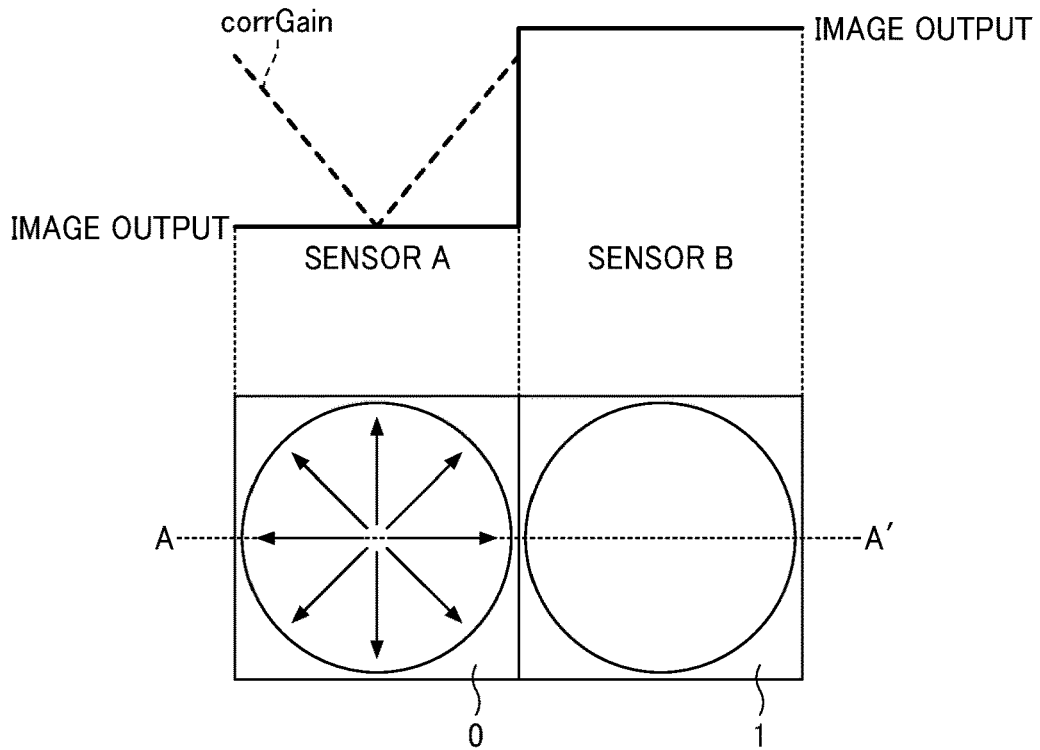
FIG. 2 is an exemplary diagram for describing a disadvantage of a conventional exposure difference correcting technique.

Conventional exposure difference correction will be described with reference to FIG. 2. FIG. 2 is an exemplary diagram for describing a disadvantage of a conventional exposure difference correcting technique. In FIG. 2, a capturing exposure of the sensor B is larger than a capturing exposure of the sensor A. For description, in FIG. 2, a RAW output value in a case where it is assumed that an image of an object having completely uniform luminance be captured with an exposure difference is an image output. A cross-sectional diagram taken along line a line AA' in FIG. 2 is an image output.

In a case where the image has such an exposure difference, it is considered to apply a positive gain to the partial image 0 of the sensor A or to apply a negative gain to the partial image 1 of the sensor B. However, it is not preferable to apply a negative gain as described later.

To avoid using a negative gain, in comparative exposure difference correcting technique, a method is adopted in which a positive gain is applied to brighten only the partial image 0 of the sensor A captured with dark exposure. Applying the gain means is changing a luminance of the captured image by the image processing.

In FIG. 2, an exposure difference correcting gain corrGain indicated by a dotted line is a gain to be applied to the partial image 0. As illustrated in FIG. 2, a gain at the center of the circular partial image 0 is zero, and the gain is applied to be gradually increased along a radial direction and to be a capturing exposure of the partial image 1 in a peripheral portion. Therefore, the exposure difference correcting gain corrGain in FIG. 2 has a shape in which a cone is turned upside down.

However, in the exposure difference correction, a large exposure difference is to be corrected within a range of the partial image 0. This might cause an image to look very strange due to a rapid change in luminance from the center to the peripheral area of the partial image 0. In addition, since luminance of the peripheral portion of the partial image 0 is largely separated from an initial target exposure (capturing exposure), there is a disadvantage such that an image tends to have a strong overexposure impression.

To connect a plurality of partial images means integration of a plurality of partial images or formation of a single image from the plurality of partial images.

The gain indicates a ratio between an input and an output of an electric circuit, and then, the meaning of the gain is changed and indicates a coefficient to increase or decrease a signal. The gain to increase the signal is referred to as a positive gain, and the gain to decrease the signal is referred to as a negative gain. Furthermore, the gain may indicate increase or decrease itself.

To correct the partial image with a correction gain means multiplying a pixel value of the partial image by the gain. Furthermore, the gain may be added to or subtracted from the pixel value.

Therefore, the omnidirectional imaging device 10 according to the present embodiment corrects an exposure difference to obtain an image with less sense of discomfort as follows.

Figure 3:
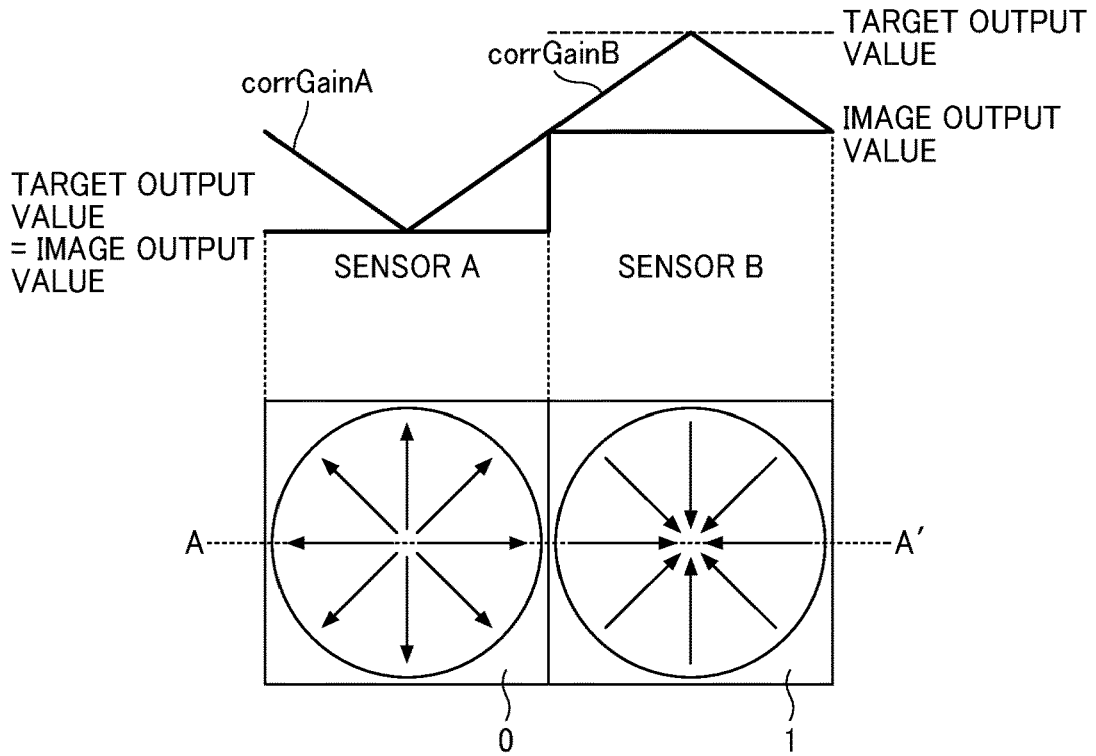
FIG. 3 is an exemplary diagram for describing an outline of an exposure difference correcting technique according to the present embodiment.

FIG. 3 is an exemplary diagram for describing an outline of the exposure difference correcting technique according to the present embodiment.

(1) First, the sensor B captures an image with a capturing exposure lower than a target exposure. With this exposure, an exposure difference between the partial images 0 and 1 can be reduced.

(2) Then, the omnidirectional imaging device 10 corrects the partial images 0 and 1 with an exposure difference correcting gain that gradually increases from the center portion of the sensor A toward the center portion of the sensor B. It is assumed that the cross-sectional diagram taken long a line AA' in FIG. 3 be an image output. That is, the exposure is corrected so that not only the partial image 0 but also the partial image 1 which is darkly captured be more brightened.

According to such correction, at the boundary between the partial images 0 and 1, the exposure difference correcting gain is applied to a peripheral portion of the partial image 0, and the exposure difference correcting gain is not applied to a peripheral portion of the partial image 1. Therefore, the luminance of the partial image 0 is the same as the luminance of the partial image 1.

Furthermore, an amount of change in the luminance from the center portion of the partial image 0 to the periphery is smaller than that in the conventional one, the image has less sense of discomfort. In addition, since the exposure of the peripheral portion of the partial image 0 is not different from the initial target exposure (capturing exposure) very much, an overexposed impression is hardly made.

Furthermore, the exposure difference correcting gain is applied to the center portion of the partial image 1, and the initial target exposure coincides with the luminance. Therefore, it is unlikely to make an impression such that the luminance of the partial image 1 is not sufficient.

Figure 4:
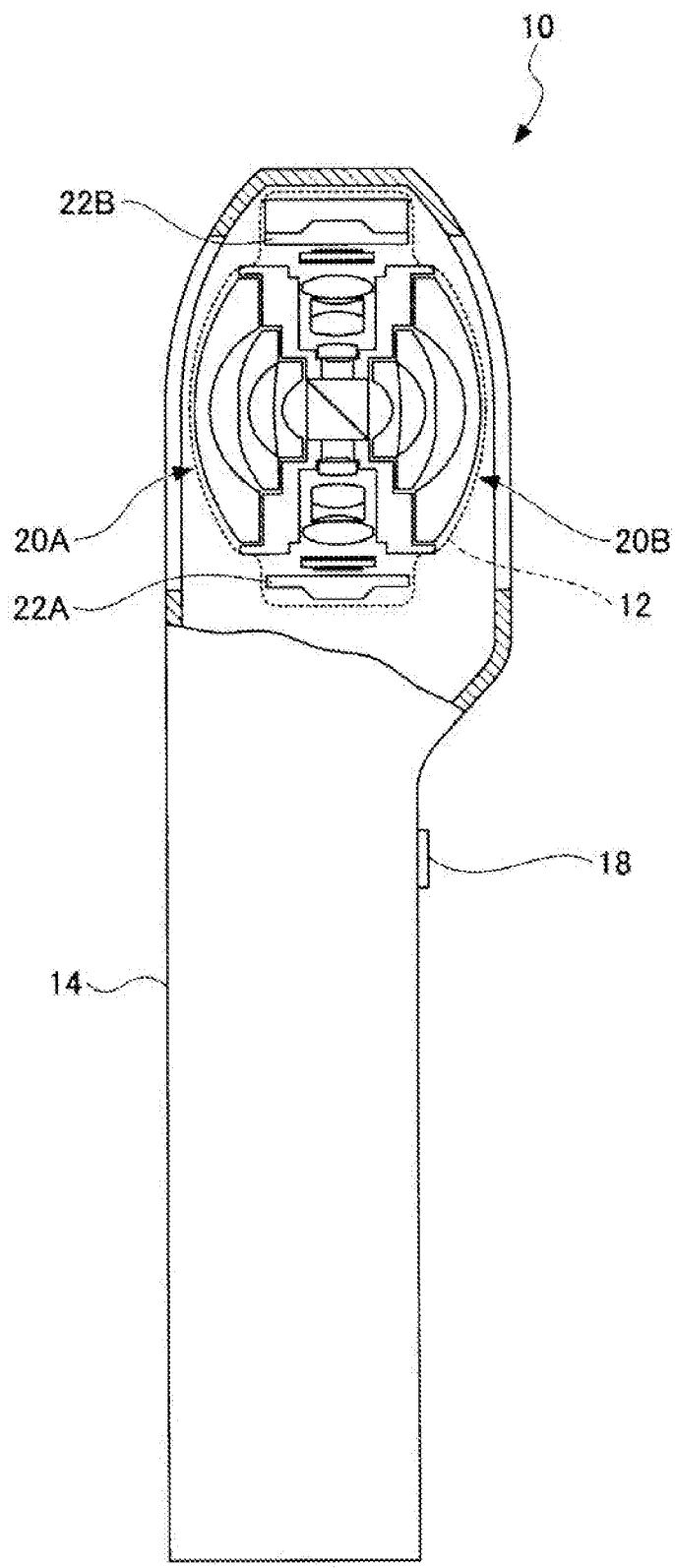
FIG. 4 is an exemplary cross-sectional view of an omnidirectional imaging device.

Hereinafter, a general arrangement of the omnidirectional imaging device 10 according to the present embodiment will be described with reference to FIGS. 4 and 5. FIG. 4 is a cross-sectional view of the omnidirectional imaging device 10 according to the present embodiment. The omnidirectional imaging device illustrated in FIG. 4 includes a photographing body 12, a housing 14 that holds the photographing body 12 and components such as a controller and a battery, and a shutter button 18 provided on the housing 14.

The photographing body 12 illustrated in FIG. 4 includes two lens optical systems 20A and 20B (referred to as a lens optical system 20) and two solid-state imaging elements 22A and 22B (referred to as a solid-state imaging element 22) such as a Charge Coupled Device (CCD) sensor and a Complementary Metal Oxide Semiconductor (CMOS) sensor.

In the present embodiment, a combination of the single lens optical system 20 and the single solid-state imaging element 22 is referred to as a photographing optical system. Each lens optical system 20 may be formed as, for example, a fisheye lens having six groups of seven lenses. In the example illustrated in FIG. 4, the fisheye lens has a full angle of view larger than 180 degrees (=360 degrees/n; n=2), and preferably has an angle of view equal to or larger than 185 degrees, and more preferably has an angle of view equal to or larger than 190 degrees.

Positions of optical elements (lens, prism, filter, and aperture diaphragm) of the two lens optical systems 20A and 20B are determined with respect to the solid-state imaging elements 22A and 22B so that optical axes of the optical elements are positioned perpendicular to a center portion of a light receiving region of the corresponding solid-state imaging element 22 and the light receiving region makes an imaging plane of the corresponding fisheye lens. Each of the solid-state imaging element 22 is a two-dimensional imaging element, of which the light receiving region forms an area, which converts light collected by the paired lens optical system 20 into an image signal.

In the embodiment illustrated in FIG. 4, the lens optical systems 20A and 20B have the same specification and are oppositely combined so that the optical axes coincide with each other. The solid-state imaging elements 22A and 22B converts a received light distribution into an image signal and output the signal to an image processing unit on the controller. The image processing unit connects and synthesizes captured images input from the respective solid-state imaging elements 22A and 22B and generates an image with a solid angle of 4π radian (referred to as "omnidirectional image" below). The omnidirectional image is an image of all the directions that can be seen from an image capturing point. Here, in the embodiment illustrated in FIG. 4, the omnidirectional image is generated. However, in the other embodiments, a so-called panorama image may be generated that is an image of 360 degrees (or about 180 degrees) of a horizontal plane.

As described above, since the fisheye lens has a full angle of view exceeding 180 degrees, when the omnidirectional image is imaged, an overlapped image portion of the captured images captured by the respective photographing optical systems is used as a reference to connect images as reference data indicating the same image. The generated omnidirectional image is, for example, included in the photographing body 12 or is output to an external storage medium such as a display device coupled to the photographing body 12, a printer, an SD (registered trademark) card, and a compact flash (registered trademark).

Figure 5:
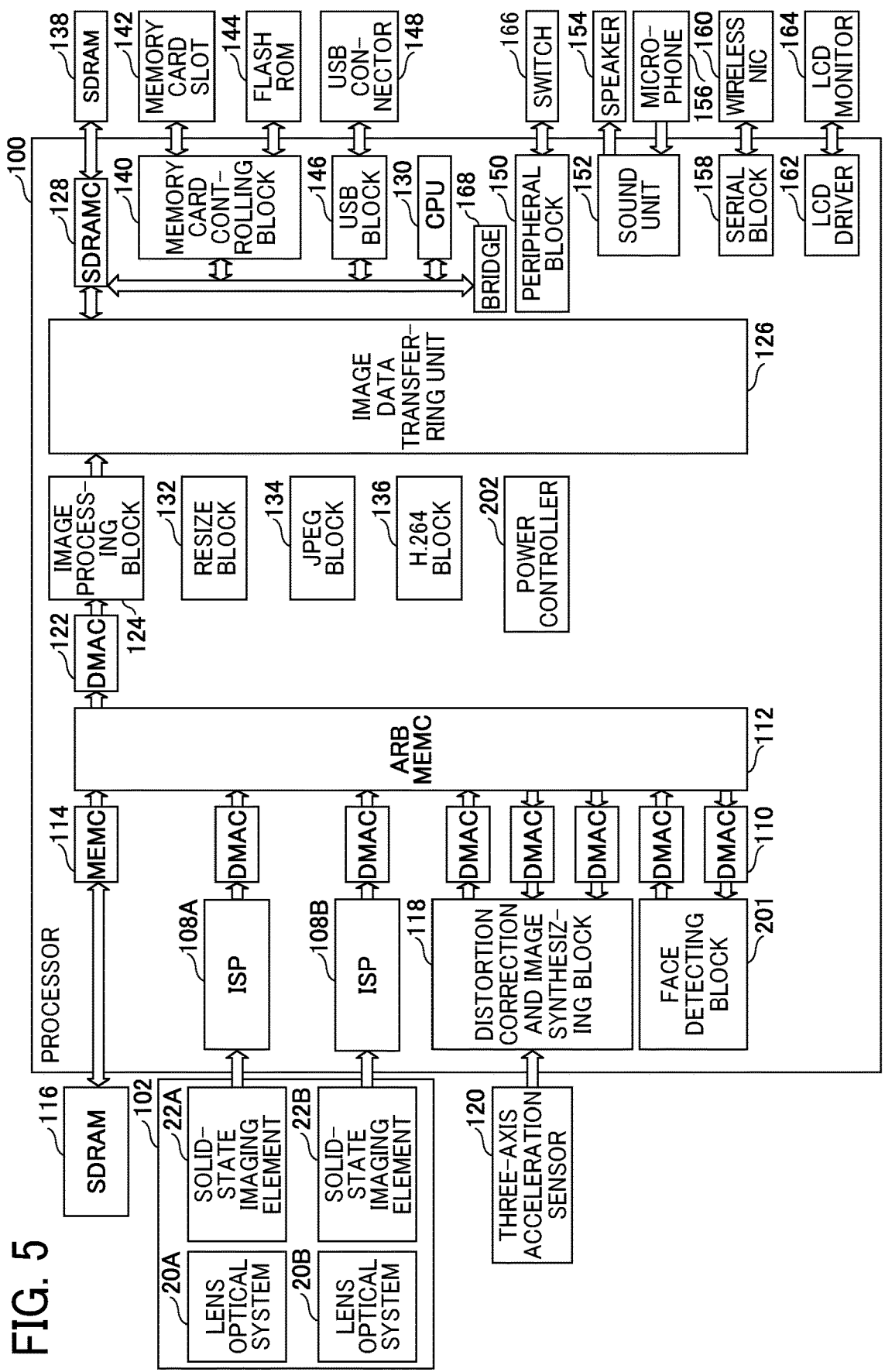
FIG. 5 is an exemplary hardware configuration diagram of the omnidirectional imaging device.

FIG. 5 illustrates a hardware configuration of the omnidirectional imaging device according to the present embodiment. The omnidirectional imaging device includes a digital still camera processor (simply referred to as processor below) 100, a lens barrel unit 102, and various components coupled to the processor 100. The lens barrel unit 102 includes the two lens optical systems 20A and 20B and the solid-state imaging elements 22A and 22B. The solid-state imaging element 22 is controlled by a control instruction from a CPU 130 in the processor 100. The CPU 130 will be described later in detail.

The processor 100 includes Image Signal Processors (ISP) 108, Direct Memory Access Controllers (DMAC) 110, and an arbiter (ARBMEMC) 112 for arbitrating a memory access. In addition, the processor 100 includes a Memory Controller (MEMC) 114 for controlling the memory access, a distortion correction and image synthesizing block 118, and a face detecting block 201. The ISPs 108A and 108B respectively performs Automatic Exposure (AE) control, white balance setting, and gamma setting on images input through signal processing by the solid-state imaging elements 22A and 22B.

The MEMC 114 is coupled to an SDRAM 116. The SDRAM 116 temporarily stores data when the ISPs 108A and 108B and the distortion correction and image synthesizing block 118 perform processing. The distortion correction and image synthesizing block 118 performs top and bottom correction (inclination correction) by using information from a three-axis acceleration sensor 120 and distortion correction on the two captured images obtained from the two photographing optical systems and synthesizes the two partial images. Note that the face detecting block 201 detects a face by using the image of which the inclination has been corrected and specifies the position of the face.

The processor 100 further includes a DMAC 122, an image processing block 124, the CPU 130, an image data transferring unit 126, a SDRAMC 128, a memory card controlling block 140, an USB block 146, a peripheral block 150, a sound unit 152, a serial block 158, an LCD driver 162, and a bridge 168.

The CPU 130 controls operations of units of the omnidirectional imaging device 10. The image processing block 124 performs various image processing on image data. The resize block 132 enlarges or reduces the size of the image data by interpolation processing. The JPEG block 134 is a codec block that performs JPEG compression and decompression. The H.264 block 136 is a codec block that compresses and decompresses a moving image such as H.264. In addition, the processor 100 includes a power controller 202.

The image data transferring unit 126 transfers the image on which the image processing has been performed by the image processing block 124. The SDRAMC 128 controls an SDRAM 138 coupled to the processor 100, and the SDRAM 138 temporarily stores image data when various processing is performed on the image data in the processor 100.

The memory card controlling block 140 controls reading and writing from/to a memory card and a flash read only memory (ROM) 144 inserted into the memory card slot 142. The memory card slot 142 is a slot to detachably attach a memory card to the omnidirectional imaging device 10. The USB block 146 controls USB communication to an external device such as a personal computer coupled via the USB connector 148 and the like. The peripheral block 150 is coupled to a power switch 166.

The sound unit 152 is coupled to a microphone 156 that receives an audio signal from a user and a speaker 154 that outputs the recorded audio signal and controls sound input and output. The serial block 158 controls serial communication with an external device such as a personal computer and is coupled to a wireless Network Interface Card (NIC) 160. The Liquid Crystal Display (LCD) driver 162 is a driver circuit that drives an LCD monitor 164 and performs conversion to a signal used to display various states on the LCD monitor 164.

The flash ROM 144 stores a control program written in a code that can be decoded by the CPU 130 and various parameters. When a power supply is turned on by operating the power switch 166, the control program is loaded to a main memory, and the CPU 130 controls operations of the respective units of the device according to the program read into the main memory. Concurrently, the SDRAM 138 and a local SRAM temporarily store data required for control.

By using rewritable flash ROM 144, the control program and the parameter for control can be changed, and a version of the function can be easily updated.

Figure 6A:
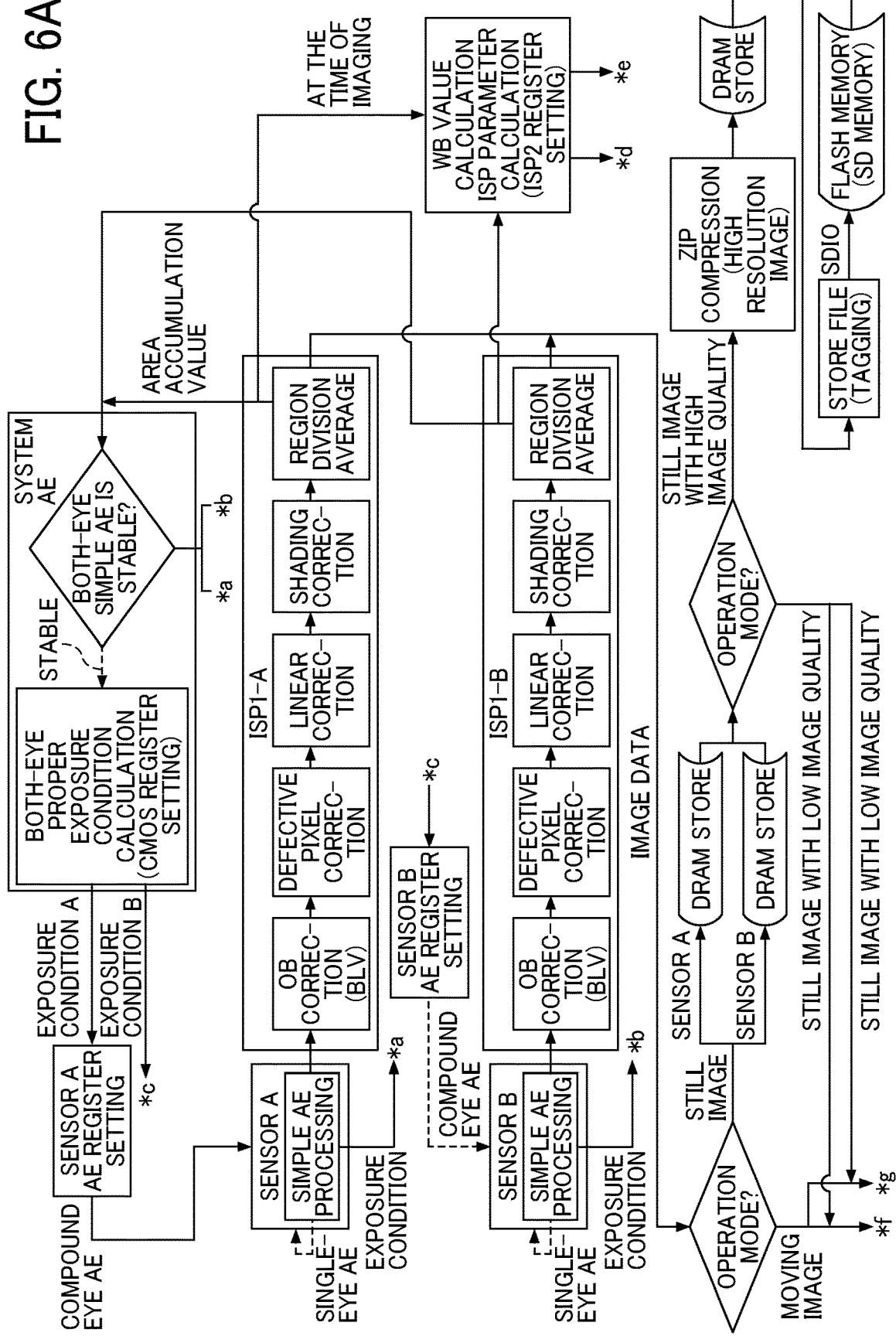
FIG. 6A is a diagram for describing a flow of entire image processing of the omnidirectional imaging device.
Figure 6B:
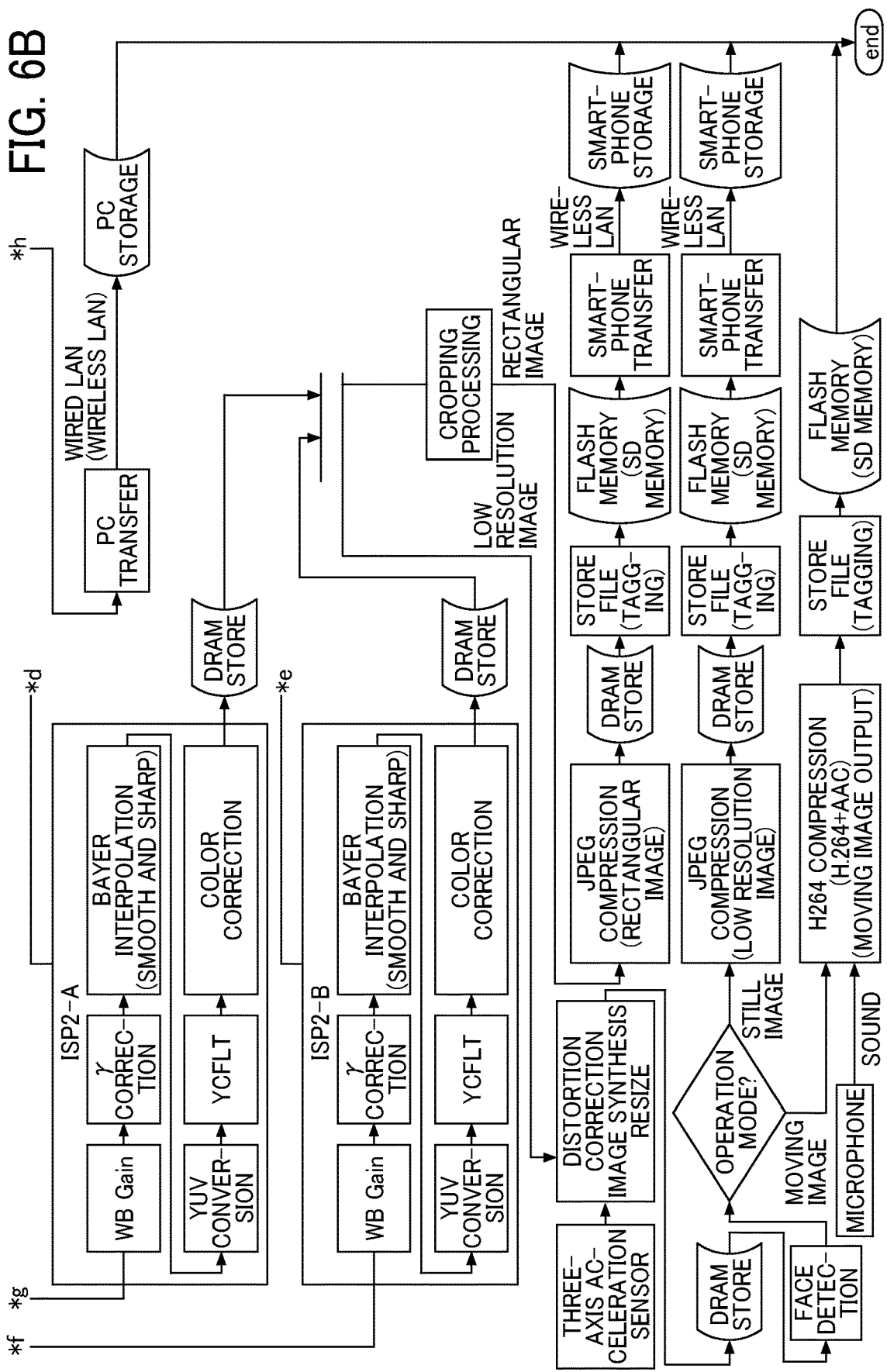
FIG. 6B is a diagram for describing a flow of the entire image processing of the omnidirectional imaging device.

FIGS. 6A and 6B are diagrams for describing a flow of entire image processing of the omnidirectional imaging device 10 according to the present embodiment, and main functional blocks to control an image capturing condition are illustrated in FIGS. 6A and 6B.

First, as illustrated in FIG. 6A, each of the sensor A (solid-state imaging element 22A) and the sensor B (solid-state imaging element 22B) captures an image under a predetermined exposure condition parameter. Subsequently, the ISPs 108 (108A and 108B) illustrated in FIG. 5 respectively perform processing of ISP1-A and ISP1-B on the partial images respectively output from the sensors A and B. As the processing of ISP1-A and ISP1-B, optical black (OB) correcting processing, defective pixel correction processing, Linear correcting processing, Shading correcting processing, and region division average processing are performed, and the results of the processing are stored in the memory.

The optical black (OB) correcting processing is processing for performing clamp correction on an output signal in an effective pixel region with an output signal in an optical black region of the sensors A and B as a reference level of black. The solid-state imaging element such as a CMOS is manufactured by forming a large number of photosensitive elements on a semiconductor substrate. However, because impurities are included in the semiconductor substrate at the time of manufacture, a defective pixel of which pixel values cannot be locally taken may be generated. The defective pixel correction processing is processing for correcting the pixel value of the defective pixel based on synthesized signals from a plurality of pixels adjacent to the defective pixel described above.

In the Linear correcting processing, linear correction is performed for each of the RGB. The shading correcting processing is processing for correcting distortion of shading of the effective pixel region by multiplying an output signal of the effective pixel region by a predetermined correction coefficient. The region division average processing is processing for dividing an image region included in the captured image into a plurality of regions and calculating an integration value (or integration average value) of luminance for each divided region. The results of this processing are used in the AE processing.

After the processing of ISP1-A and ISP1-B has been completed, subsequently, as illustrated in FIG. 6B, the ISPs 108 (108A and 108B) respectively perform processing of ISP2-A and ISP2-B. As the processing of ISP2-A and ISP2-B, white balance (WBGain) processing, gamma (γ) correcting processing, Bayer interpolation processing, YUV converting processing, edge enhancement (YCFLT) processing, and color correcting processing are performed, and the results of the processing are stored in the memory.

A color filter of one of colors of red (R), green (G), and a blue (B) is attached on a photodiode on each of the sensors A and B that accumulates light amount from an object. Since the amount of light to be transmitted varies according to the color of the filter, an amount of charges accumulated in the photodiode varies. The color having the highest sensitivity is G, and the sensitivity of R and B is lower than and about half of the sensitivity of G. In the white balance (WB) processing, processing for applying gains to R and B is performed to compensate the differences in the sensitivity and to enhance whiteness of the white in the captured image.

Furthermore, since a color of an object changes according to a light source color (for example, sunlight and fluorescent light), a function is provided for changing and controlling the gains of R and B so as to enhance whiteness of the white even when the light source is changed. The parameter of the white balance processing is calculated based on integration value (or accumulation average value) data of RGB for each divided region calculated by the region division average processing.

The output signal has a nonlinear relationship with respect to an input signal. In a case of such a nonlinear output, a person cannot correctly see an image due to no gradation in brightness and darkness of the image. Therefore, gamma (γ) correcting processing is performed for previously processing the input signal so as to maintain the linearity of the output in consideration of characteristics of an output device.

In the CMOS, a color filter of one of colors of red (R), green (G), and blue (B) is attached for each pixel, and the color filters are arranged in layout referred to as a Bayer layout, and RAW data has information of a single color for each pixel. However, to see an image from the RAW data, information of three colors of R, G, and B for each pixel is required, and processing for interpolating information from surrounding pixels to compensate two missing colors is performed. This processing is referred to as the Bayer interpolation processing. In a JPEG image in a file format that is generally used for a digital camera and the like, since an image is created from YUV data, RGB data is converted into the YUV data.

The edge enhancement (YCFLT) processing is processing for extracting an edge portion from a luminance signal of an image, applying a gain relative to the edge, and removing a noise of the image in parallel to the edge extraction. Specifically, an edge extracting filter that extracts the edge portion from a luminance (Y) signal of the image, a gain multiplying unit that applies a gain relative to the edge extracted by the edge extracting filter, a low pass filter (LPF) that removes the noise of the image in parallel to the edge extraction, and a data adding unit that adds the edge extraction data to which the edge has been multiplied and image data on which the LPF processing has been performed are included.

In the color correction processing, saturation setting, hue setting, partial hue change setting, color suppression setting, and the like are performed. The saturation setting is parameter setting for determining a depth of a color, and indicates an UV color space. For example, as a length of a vector from an origin to a dot of R is longer with respect to the color of R in a second quadrant, the color is deeper.

The data of which the color has been corrected is stored in a memory (DRAM), and the cropping processing is performed based on the stored data. The cropping processing is processing for generating a thumbnail image by cutting out a center region of the image.

An action of the imaging device according to the present embodiment will be described with reference to FIGS. 6A and 6B. In the ISP1-A, relative to a Bayer RAW image output from the sensor A, the optical black (OB) correcting processing, the defective pixel correction processing, the Linear correcting processing, the Shading correcting processing, and the region division average processing are performed. The image is stored in the DRAM.

In the ISP1-B, similarly, relative to a Bayer RAW image output from the sensor B, the optical black (OB) correcting processing, the defective pixel correction processing, the Linear correcting processing, the Shading correcting processing, and the region division average processing are performed. The image is stored in the DRAM.

Each of the sensors A and B has an independent simple AE processing function, and each of the sensors A and B can independently set a proper exposure. In a case where change in an exposure condition of each of the sensors A and B is reduced and the exposure condition is stable, the exposure of each of the sensors A and B is set to a proper exposure by using an area integrated value obtained by the region division average processing so that the brightness at the image boundary portion of the two images are similar to each other.

With respect to data of the sensor A of which the processing of ISP1-A has been performed, the white balance (WBGain) processing, the gamma (γ) correcting processing, the Bayer interpolation processing, the YUV converting processing, the edge enhancement (YCFLT) processing, and the color correcting processing in the ISP2-A are performed.

The processed data is stored in the DRAM. Similarly, with respect to data of the sensor B of which the processing of ISP1-B has been performed, the white balance (WBGain) processing, the gamma (γ) correcting processing, the Bayer interpolation processing, the YUV converting processing, the edge enhancement (YCFLT) processing, and the color correcting processing in the ISP2-B are performed. The processed data is stored in the DRAM.

Relative to the data on which the processing of ISP2-A or ISP2-B has been performed, processing for cutting the image of the sensor A or the sensor B into a regularized image (cropping processing) is performed, and after that, distortion correction and synthesis processing is performed. In a process of the distortion correction and synthesis processing, the inclination correction (top and bottom correction) is performed by obtaining information from the three-axis acceleration sensor. By performing JPEG compression, the image is further compressed with a compression coefficient of about 0.16.

The data is stored in the DRAM, and a file is stored (tagging). In addition, the data is stored in a medium such as an SD card via a SDIO. The data is transferred to a smartphone (mobile terminal and the like) using wireless LAN (Wi-Fi, Bluetooth (registered trademark), and the like).

The data used in the processing in FIGS. 6A and 6B is rectangular image data that is partial spherical image. The data is to be displayed as a thumbnail image and the like. In the present embodiment, two or more omnidirectional images can be implemented by images that can be captured. However, in FIGS. 6A and 6B, a flow in a case where the images are synthesized by using two imaging elements is illustrated as a specific example.

Figure 7:
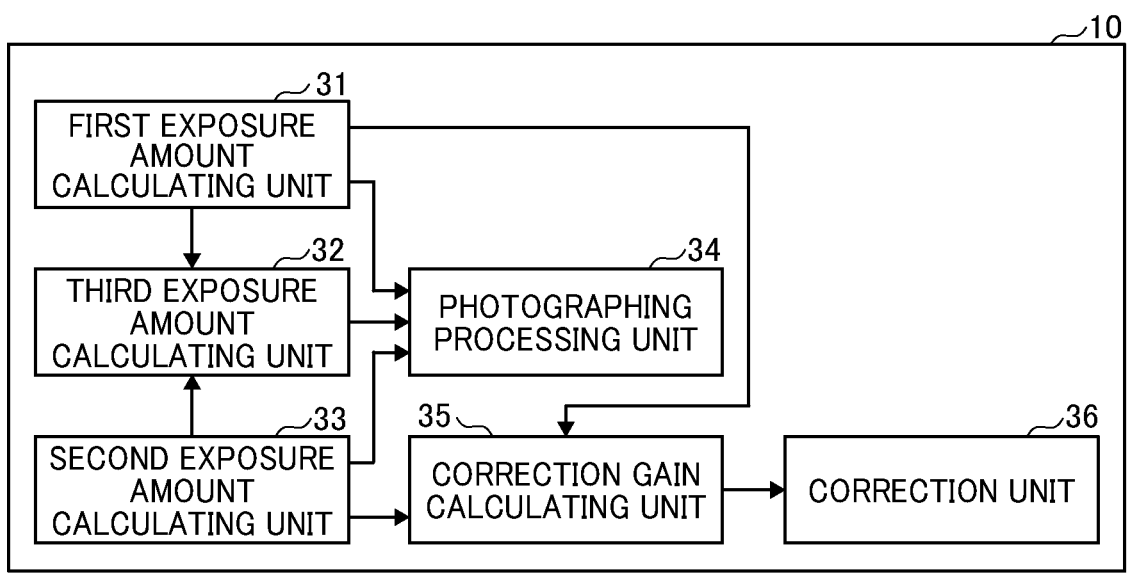
FIG. 7 is an exemplary functional block diagram in which characteristic functions of an imaging device according to the present embodiment are illustrated in a block form.

FIG. 7 is an exemplary functional block diagram in which characteristic functions of the imaging device according to the present embodiment are illustrated in a block form. The imaging device includes a first exposure amount calculating unit 31, a second exposure amount calculating unit 33, and a third exposure amount calculating unit 32, a photographing processing unit 34, a correction gain calculating unit 35, and a correction unit 36.

These functions of the imaging device are implemented by controlling each component of the imaging device by executing the control program stored in the flash ROM 144 and various parameters by the CPU 130 and performing image processing by the ISPs 108A and 108B.

That is, each function in FIG. 7 can be implemented by software or can be implemented by a single or a plurality of processing circuits. The "processing circuit" includes a processor programmed to perform each function by software as a processor mounted by an electronic circuit and devices designed to perform each function described in the present embodiment such as an Application Specific Integrated Circuit (ASIC), a digital signal processor (DSP), a field programmable gate array (FPGA), a System on a chip (SOC), a Graphics Processing Unit (GPU), and a conventional circuit module.

The first exposure amount calculating unit 31 determines an appropriate exposure amount (EvTarget1 to be described later) by a signal obtained from the sensor A. The second exposure amount calculating unit 33 determines an appropriate exposure amount (EvTarget2 to be described later) by a signal obtained from the sensor B.

The third exposure amount calculating unit 32 determines a capturing exposure amount (EvCaptureA and EvCaptureB) by making the larger one of the exposure amount of the sensor A (first exposure amount) and the exposure amount of the sensor B (second exposure amount) be smaller than an original value.

Based on the exposure amounts of the sensors A and B, the correction gain calculating unit 35 calculates an exposure difference correcting gain corrGainA of the partial image 0 captured by the sensor A and calculates an exposure difference correcting gain corrGainB of the partial image 1 captured by the sensor B.

The photographing processing unit 34 makes one of the sensors A and B having smaller exposure amount capture an image with the exposure amount of the sensor and makes one of the sensors A or B having larger exposure amount capture an image with a capturing exposure amount (EvCaptureA and EvCaptureB).

The correction unit 36 corrects the partial image 0 with the exposure difference correcting gain corrGainA and corrects the partial image 1 with the exposure difference correcting gain corrGainB.

Figure 8:
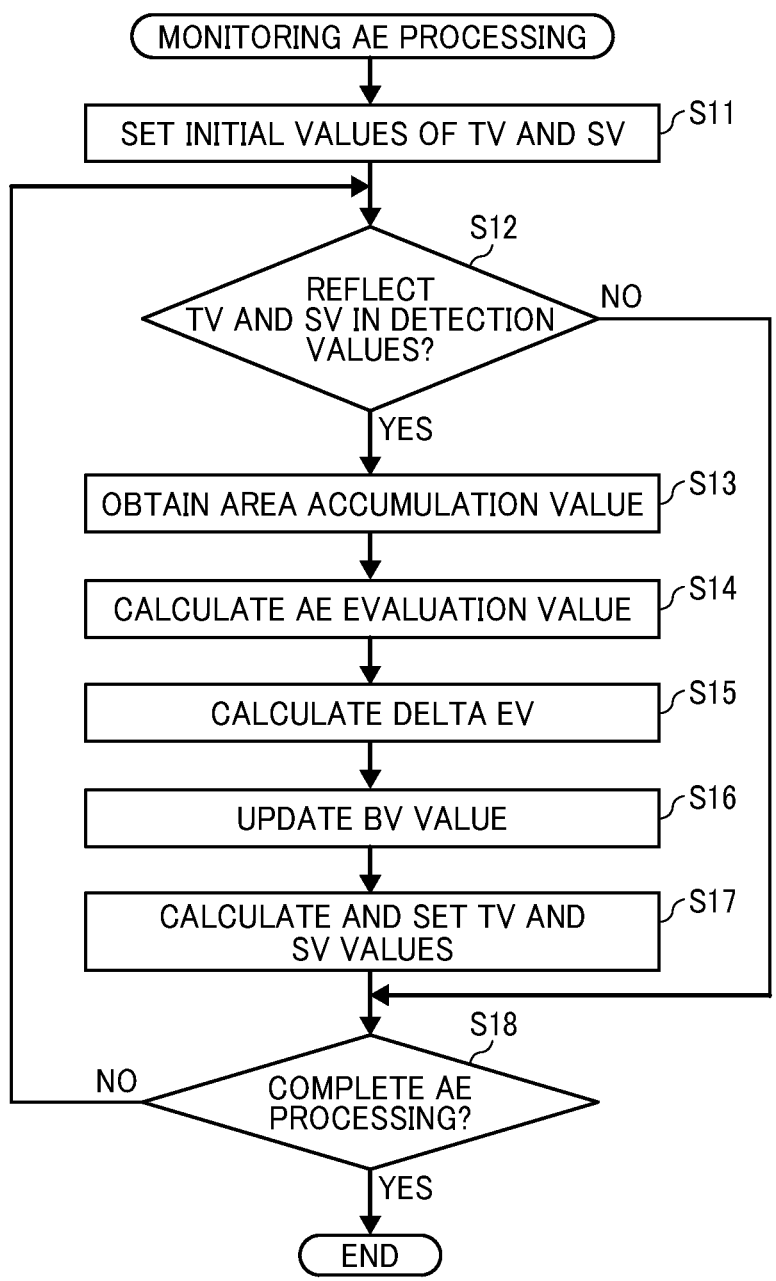
FIG. 8 is a diagram of a flow of a series of AE processing at the time of monitoring the omnidirectional imaging device.

FIG. 8 is a diagram of a flow of a series of AE processing at the time of monitoring the omnidirectional imaging device. Monitoring is processing for displaying an image on the LCD monitor 164 before the shutter button is pressed. First, each of the first exposure amount calculating unit 31 and the second exposure amount calculating unit 33 sets initial values of TV (shutter speed) and SV (sensitivity) with respect to the sensors A and B (step S11). The values to be set are common to the sensors A and B.

Then, the first exposure amount calculating unit 31 and the second exposure amount calculating unit 33 calculate BV (object luminance data) and EV (exposure amount) by the following formula (1). Although the AV indicates a diaphragm value, a diaphragm mechanism is not provided in the present embodiment. Therefore, the AV value is fixed.

$$BV=EV=TV+AV-(SV-0\times 50) \quad \ldots \quad (1)$$

The values of TV, AV, SV, BV, and EV are values in the Apex format (1/48 step) and are used for calculation. Apex is an abbreviation of Additive System of Photographic Exposure that is a conversion system standard for photography. According to the Apex system, elements required for capturing an image (lens diaphragm, exposure time, imaging element sensitivity, object luminance) are used as a unit of the same dimension, and the optimum value can be calculated by simple addition/subtraction processing of the elements.

Next, the first exposure amount calculating unit 31 and the second exposure amount calculating unit 33 determine whether the TV (shutter speed) and the SV (sensitivity) are reflected to a detection value (step S12), and obtain the area integrated values of the sensors A and B in a case where the TV and the SV are reflected (step S13).

In a case where the TV (shutter speed) and the SV (sensitivity) are not reflected to the detection value in step S12, the procedure proceeds to step S18. The detection value is a detection value regarding brightness, and is a light amount detected by a simple AE processing mechanism of each of the sensors A and B.

Figures 9, 10:
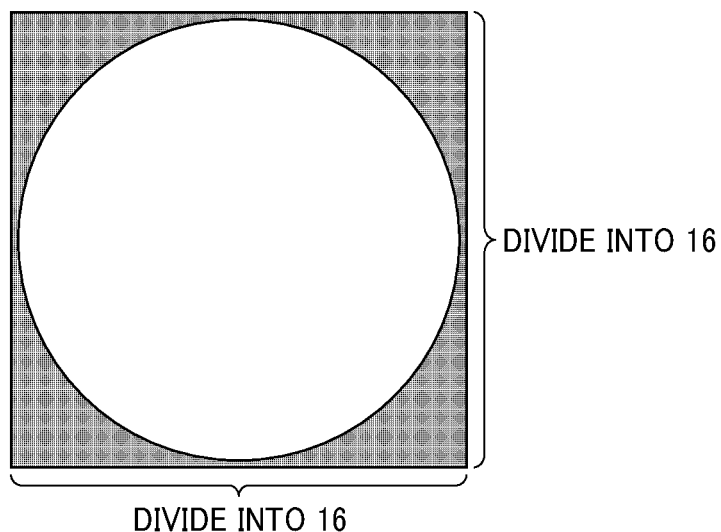
FIG. 9 is a diagram of an example of division of an image.
FIG. 10 is a diagram of an exemplary AE table.

As illustrated in FIG. 9, the area integrated value is calculated by equally dividing RAW-RGB data of an image into 16 blocks in the horizontal direction and 16 blocks in the vertical direction and integrating RGB value to each divided block. A Y value (luminance value) is obtained by using the following formula (2) from the RGB value for each block. In the present embodiment, an inner portion of a circular shape which is not shielded is used as the area integrated value, and this is assumed as the Y value.

luminance value=R×0.299+G×0.587+B×0.114 ... (2) In the present embodiment, the number of divisions of the block is set to 16×16=256. However, the number is not limited to this. However, when it is assumed that the number of divided blocks be n, n≥4 is satisfied.

Furthermore, in the present embodiment, equal division has been made. However, the kind of division is not limited to this. However, it is preferable that all the divided blocks have the same area and the same shape.

Here, the area integrated value will be described in detail. The area integrated value is calculated for each of the divided blocks.

In the present embodiment, the divided block is obtained by equally dividing the captured image as described above. Therefore, if the captured image has about 10 million pixels, each divided block has about 39,000 pixels. Each pixel included in each divided block is information is R, G, or B component of the corresponding object portion, and each component is recorded and used as 12-bit information in the present embodiment.

That is, in each of 256 divided blocks, 12-bit information of the R, G, and B components is included on which the number is the same as the number of pixels in each block (about 10 million pixels÷256=about 39,000 pixels).

The area integrated value is calculated by adding and averaging all the R, G, and B components included in each block for each of the divided blocks. In the present embodiment, the area integrated value is output as 12-bit information for each of the R, G, and B components of each of the 256 divided blocks.

In the present embodiment, a ratio of the R, G, and B pixels is R:G:B=1:2:1. Each divided block includes R pixels=about 0.975 million pixels, G pixels=about 1.95 million pixels, and B pixels=0.975 million pixels.

Next, the first exposure amount calculating unit 31 and the second exposure amount calculating unit 33 calculates an AE evaluation value obtained by dividing the area integrated value by an integration number (step S14). The AE evaluation value is used for each subsequent exposure calculation.

The first exposure amount calculating unit 31 or the second exposure amount calculating unit 33 averages the AE evaluation values of the sensors A and B and calculates a difference (delta EV1) from the proper exposure based on an AE table (step S15). As illustrated in FIG. 10, the AE table indicates the difference (delta EV) from the proper exposure corresponding to the AE evaluation value. In a case where the AE evaluation value is 920, the brightness is +1 EV brighter than the proper exposure.

Furthermore, in a case where the AE evaluation value is 230, the brightness is −1 EV darker than the proper exposure. With respect to the AE evaluation value between points (that is, AE evaluation value not illustrated in FIG. 10), a delta EV is calculated by linear interpolation.

Then, the first exposure amount calculating unit 31 averages the AE evaluation values of the sensor A and calculates a difference (delta EV2) from the proper exposure based on the AE table. Furthermore, the second exposure amount calculating unit 33 averages the AE evaluation values of the sensor B that are equal to or less than a certain value and calculates a difference (delta EV3) from the proper exposure based on the AE table. In a case where the delta EV corresponding to the AE evaluation value is equal to or more than +3 or equal to or less than −3, the delta EV is clipped at +3 or −3.

Next, the first exposure amount calculating unit 31 and the second exposure amount calculating unit 33 add the delta EV1 to the previously calculated BV and update object luminance data 1 (BV1) (step S16). In addition, in a case where an exposure amount 1 (EV1) is calculated based on the BV1 and the delta EV is zero, it is determined that the exposure is the proper exposure (brightness) and calculates the EV1 with which the delta EV becomes zero.

The first exposure amount calculating unit 31 and the second exposure amount calculating unit 33 calculate exposure conditions, that is, the shutter speed (TV) of the CMOS and the sensitivity (SV (gain value)) of the CMOS from the calculated EV1 according to an EV diagram and sets the calculated shutter speed and the sensitivity of the CMOS to the sensors A and B (step S17).

Figure 11:
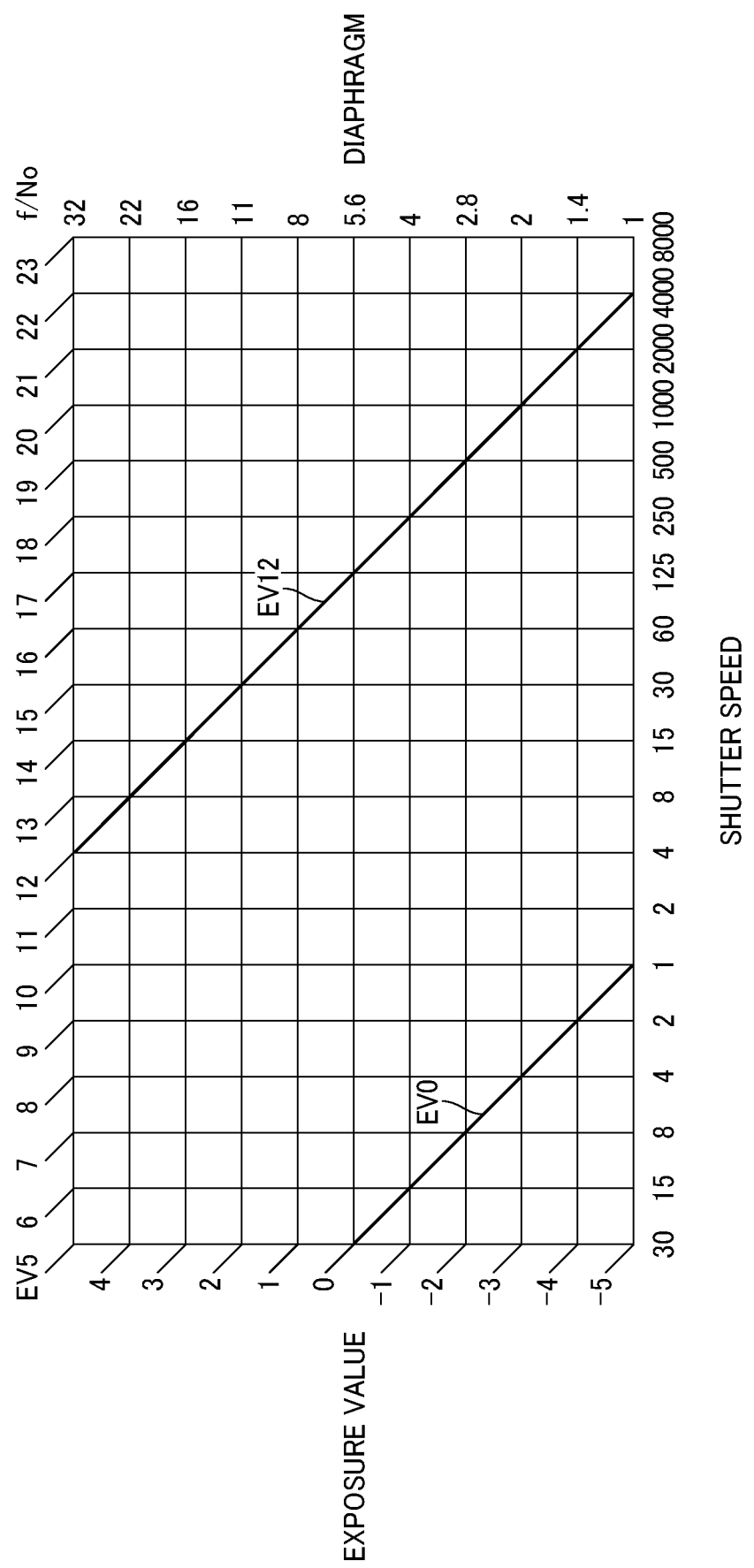
FIG. 11 is a graph of an exemplary EV diagram.

The EV diagram is a table indicating combinations of the shutter speed and the sensitivity corresponding to the EV value, and the EV diagram for monitoring may be different from that of still. FIG. 11 is an exemplary EV graph.

It is determines whether the AE processing at the time of monitoring is completed (step S18). In a case where the AE processing is not completed, the procedure returns to step S12, and obtains, in step S13, the area integrated value to which the TV (shutter speed) and the SV (sensitivity) set in step S17 are reflected. The processing in steps S12 to S18 is repeatedly performed at all times during monitoring.

Figure 12:
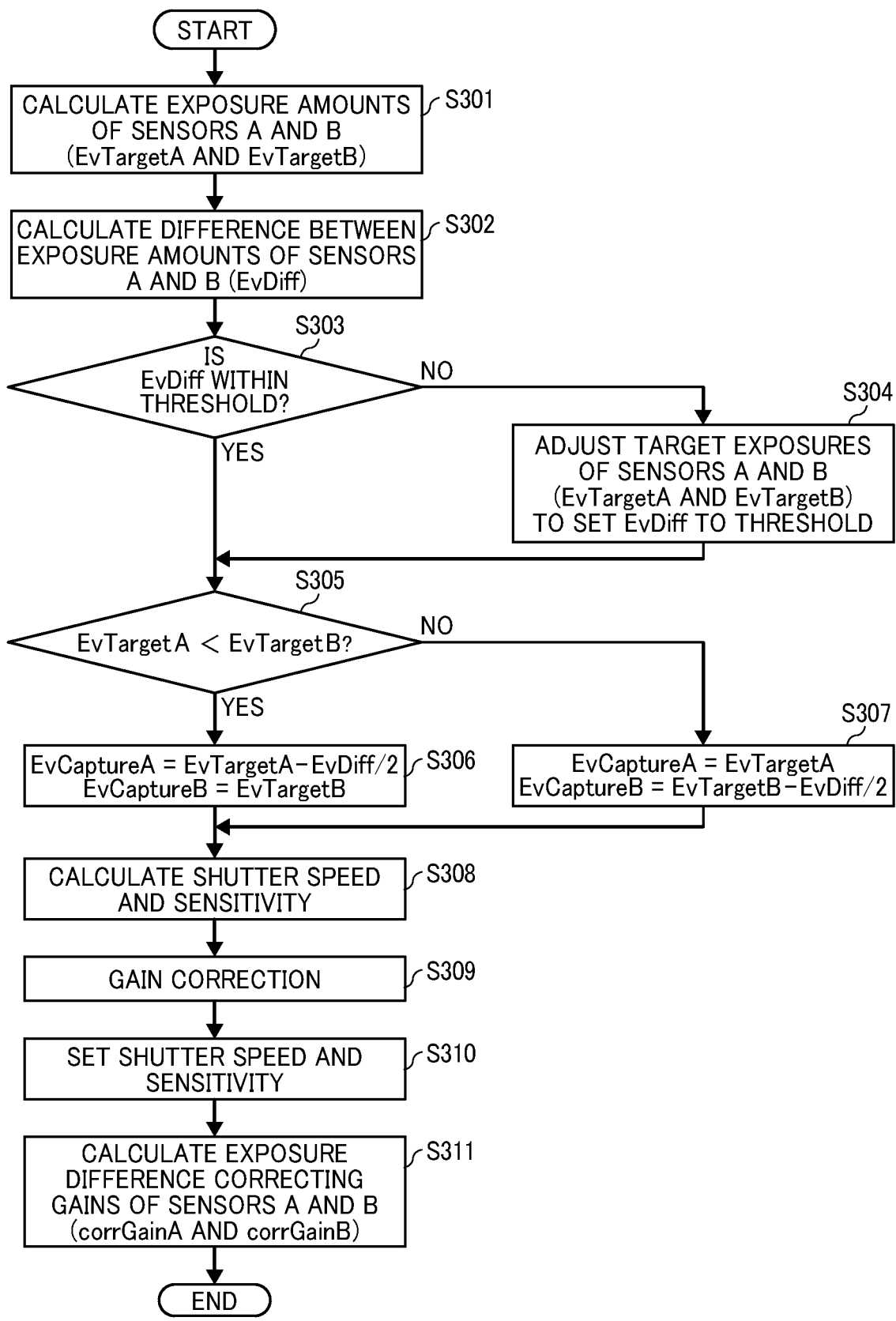
FIG. 12 is an exemplary flowchart of a series of AE processing at the time of still of the omnidirectional imaging device.

FIG. 12 is an exemplary flowchart of a series of AE processing at the time of still of the imaging device according to the present embodiment. First, the first exposure amount calculating unit 31 or the second exposure amount calculating unit 33 calculates an EV2 based on the EV value of the sensor having a larger Delta EV2 and a larger delta EV3 calculated at the time of monitoring immediately before still imaging and the EV1 (step S301). For example, in a case where delta EV2>delta EV3, the delta EV2 is set according to the following formula (3).

EV2=EV1+Delta EV2 ... (3) The EV1 is an exposure amount of the darker sensor and is assumed as a target exposure EvTargetA, and the EV2 is an exposure amount of a brighter sensor and is assumed as a target exposure EvTargetB. Accordingly, the exposure of the sensor having high luminance can be closer to the proper exposure.

Next, the third exposure amount calculating unit 32 calculates a difference between EvTargetA and EvTargetB and set the difference as EvDiff (step S302).

The third exposure amount calculating unit 32 determines whether the difference EvDiff between the target exposures is equal to or less than a threshold (step S303). If the exposure difference between the sensors A and B is too large, a luminance difference between the partial images 0 and 1 is conspicuous even when the exposure difference correcting processing is performed. Therefore, the threshold is used to limit the exposure difference between the sensors A and B to be equal to or less than a threshold. The threshold is determined in advance as the allowable maximum value of the luminance difference between the partial images 0 and 1.

In a case where the difference EvDiff between the target exposures is not equal to or less than the threshold (No in step S303), the third exposure amount calculating unit 32 calculates EvTargetA and EvTargetB so that the difference becomes equal to or less than the threshold by adjusting the values of EvTargetA and EvTargetB (step S304).

As an adjustment method, one of EvTargetA and EvTargetB that has a darker target exposure may be shifted to be brighter. Alternatively, it is possible that the one with the darker target exposure is shifted to be brighter twice and the brighter one is shifted to be darker by one. Alternatively, there is a method for shifting EvTargetA and EvTargetB by a certain amount until the difference falls below the threshold and employing EvTargetA and EvTargetB at the time when the difference falls below the threshold. EvDiff is set to the threshold.

In a case where the difference EvDiff between the target exposures is equal to or less than the threshold (Yes in step S303), the adjustment is not performed.

Next, the third exposure amount calculating unit 32 determines the brighter one of the target exposures EvTargetA and EvTargetB which have been adjusted (step S305). Then, the capturing exposures EvCaptureA and EvCaptureB of the respective sensors A and B are determined.

In a case of EvCaptureA<EvCaptureB, since the EV of the sensor A is smaller (target exposure is higher), the third exposure amount calculating unit 32 determines the capturing exposure EvCaptureB of the sensor B to be smaller than EvTargetB (step S306). The capturing exposure EvCaptureA of the sensor A may be EvTargetA. For example, a difference between the initial target exposure EvTargetB and EvTargetA is reduced by half.

Details will be described with reference to FIGS. 13A to 13C. In addition, in consideration of both photometric values, it is possible to largely reduce the capturing exposure in a case where the number of saturated pixels is larger than a predetermined value and the image is bright (for example, ⅓ of EvTargetB), and it is possible to slightly reduce the capturing exposure in a case where the average luminance is smaller than a predetermined value and the image is dark (for example, ⅔ of EvTargetB).

Similarly, in a case of EvTargetA≥EvTargetB, since the EV of the sensor B is smaller (target exposure is higher), the third exposure amount calculating unit 32 determines the capturing exposure EvCaptureA of the sensor A to be smaller than EvTargetA (step S307). The capturing exposure EvCaptureB of the sensor B may be EvTargetB.

Next, the third exposure amount calculating unit 32 calculates a shutter speed 1 (TV1) and a sensitivity 1 (SV1) based on the larger capturing exposure EvCapture (step S308). Here, the description will be made as assuming that EvCaptureA<EvCaptureB is satisfied. The third exposure amount calculating unit 32 calculates the shutter speed 1 (TV1) and the sensitivity 1 (SV1) from EvCaptureB according to the EV diagram.

Next, the third exposure amount calculating unit 32 performs processing for calculating a sensitivity 2 (SV2), that is, gain correction by adding a difference between EvCaptureA and EvCaptureB to SV1 (step S309).

Next, the third exposure amount calculating unit 32 sets TV1 and SV1 to the sensor B having larger capturing exposure and sets TV1 and SV2 to the sensor A having smaller capturing exposure (step S310). The photographing processing unit 34 photographs the partial image 0 with set TV1 and SV1 and photographs the partial image 1 with TV1 and SV2.

The partial images 0 and 1 are captured by the processing described above. By setting the shutter speeds of the sensors A and B to be the same, a moving object across the sensors A and B can be satisfactorily connected. In addition, at this time, by setting the vertical reading directions of the sensors on both sides to be the same, exposure timings are the same, and the moving objects can be more satisfactory connected.

In addition, by setting scanning directions of the solid-state imaging elements to be the same, the captured images can be easily connected.

That is, the scanning directions and orders of the solid-state imaging elements are made to be the same at a portion to be connected, an object on the boundary between cameras, especially, an effect to connect a moving object can be obtained.

For example, when an upper left portion of the captured image captured by the solid-state imaging element 22A corresponds to a lower left portion of the captured image captured by the solid-state imaging element 22B as a portion where the images are connected, the solid-state imaging element 22A scans the image from right to left and from the upper side to the lower side of the solid-state imaging element. The solid-state imaging element 22B scans from right to left and from the lower side to the upper side of the solid-state imaging element. In this way, based on the portion where the images are connected, the connection can be easily performed by controlling the scanning direction of each solid-state imaging element.

Next, the correction gain calculating unit 35 calculates exposure difference correcting gains of the sensors A and B, and the correction unit 36 corrects the exposure difference (step S311). To the sensor with the brighter one of the capturing exposures EvCaptureA and EvCaptureB, a gain on which magnification is reduced from the center portion to the periphery is applied. To the darker sensor, a gain of which magnification increases from the center portion to the periphery is applied. The gains are respectively referred to as corrGainA and corrGainB. Each of the gains CorrGainA and corrGainB is referred to as an exposure difference correcting gain. Calculation of corrGainA and corrGainB will be described with reference to FIG. 14.

Note that, the calculation of the exposure difference correcting gain in step S311 can be performed as long as the target exposures EvTargetA and EvTargetB have been calculated. For example, the exposure difference correcting gain may be calculated before step S305.

The exposure difference correcting gain will be described with reference to FIGS. 13A to 13C. FIG. 13A is a schematic diagram of EvTarget1 and EvTarget2 in step S301 in FIG. 12, FIG. 13B is a schematic diagram of target exposures EvTargetA and EvTargetB adjusted in step S304 in FIG. 12, and FIG. 13C is a schematic diagram of capturing exposures EvCaptureA and EvCaptureB. FIGS. 13A to 13C indicate a case where the target exposure of the sensor B is larger than the target exposure of the sensor A. However, in the reverse case, calculation is similarly performed.

Figure 13A:
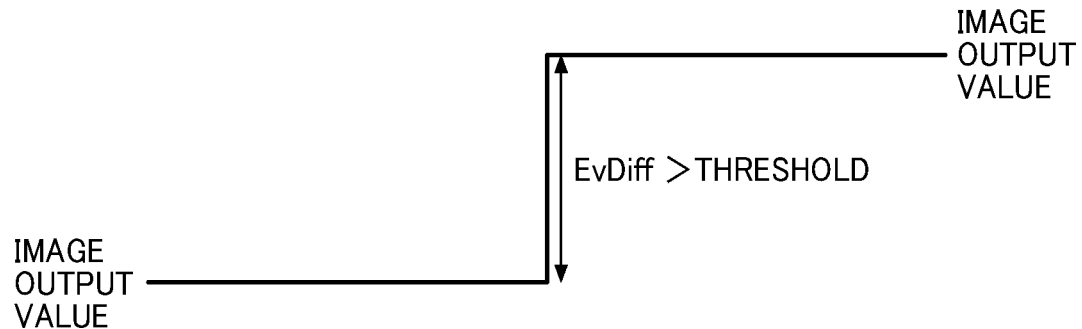
FIGS. 13A to 13C are schematic diagrams of target exposures EvTargetA and EvTargetB and capturing exposures EvCaptureA and EvCaptureB.

As illustrated in FIG. 13A, in a case where a difference between EvTargetB and EvTargetA is larger than the threshold, a luminance difference between the partial images 0 and 1 is conspicuous even when the gain is corrected. Therefore, the first exposure amount calculating unit 31 and the second exposure amount calculating unit 33 respectively determine the target exposures EvTargetA and EvTargetB so that the difference between EvTargetB and EvTargetA becomes the same as the threshold. An exemplary determining method will be described below.

$$EvTargetA = EvTargetA\ EvTargetB = EvTargetA + \text{threshold} \quad \text{(i)}$$

$$EvTargetA = EvTargetB - \text{threshold}$$
$$EvTargetB = EvTargetB \quad \text{(ii)}$$

Figure 13B:
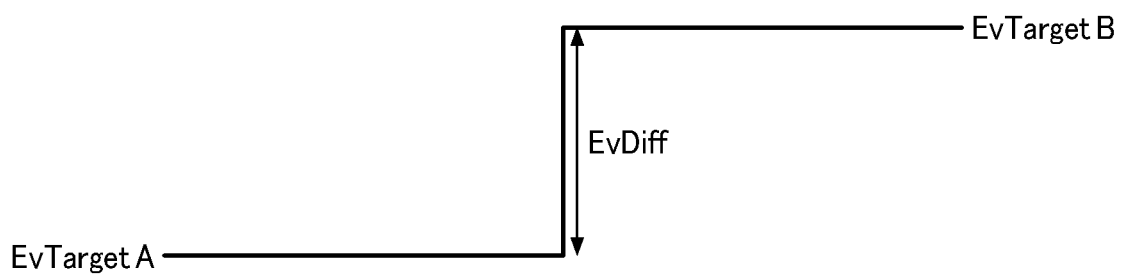
Figure 13C:
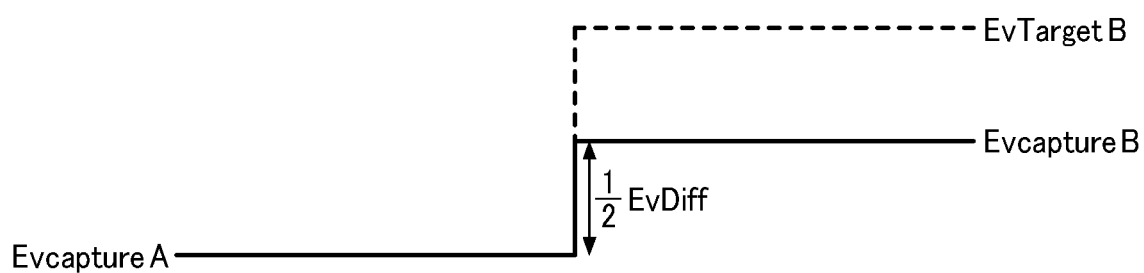

(iii) EvTargetA=EvTargetA+{(EvTargetB−EvTargetA)−threshold}/2 EvTargetB=EvTargetB−{(EvTargetB−EvTargetA)−threshold}/2 According to these calculation, the target exposures EvTargetA and EvTargetB in FIG. 13B can be obtained.

In FIG. 13B, it is adjusted that EvTargetB−EvTargetA=EvDiff. As illustrated in FIG. 13C, the third exposure amount calculating unit 32 calculates the capturing exposure EvCaptureB that is a half of EvDiff. The capturing exposure EvCaptureB is not limited to the half of EvDiff, and it is preferable that the capturing exposure EvCaptureB be smaller than EvTargetB. Furthermore, the lower limit of the capturing exposure EvCaptureB is equal to or more than the target exposure EvTargetA.

Figure 14A:
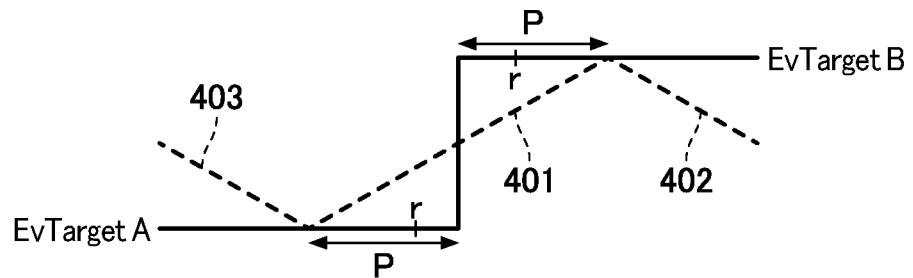
FIGS. 14A to 14C are exemplary diagrams for describing a method for calculating exposure difference correcting gains corrGainA and corrGainB.
Figure 14B:
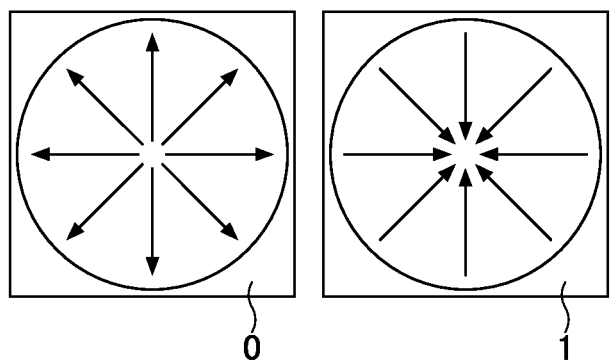
Figure 14C:
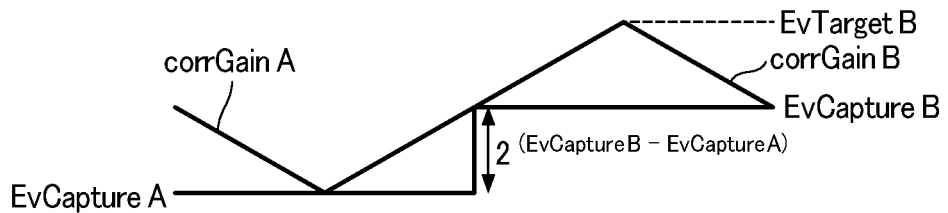

Next, a method for calculating the exposure difference correcting gains corrGainA and corrGainB will be described with reference to FIGS. 14A to 14C. FIGS. 14A to 14C are exemplary diagrams for describing the method for calculating the exposure difference correcting gains corrGainA and corrGainB. With reference to FIG. 14A, an example will be described in which corrGainA and corrGainB are calculated based on the target exposures EvTargetA and EvTargetB.

The exposure difference correcting gains corrGainA and corrGainB interpolate the center portions of the sensors A and B with a straight line 401. Straight lines 402 and 403 have inclination same as the inclination of the straight line 401 if the sensors A and B are reversed in the horizontal direction.

Radius of each of the partial images 0 and 1 is P. Here, since EV is an APEX system and the unit of EV is log 2, a difference between exposure amounts of EvTargetB and EvTargetA is expressed as $2^{\wedge}(\text{EvTargetA}-\text{EvTargetB})$. Therefore, $\{2^{\wedge}(\text{EvTargetA}-\text{EvTargetB})/2\}/P$ is the inclination of the straight line 401 in the sensor A. This is the exposure difference correcting gain corrGainA.

Since the inclination of the sensor B is the same, the value is smaller than EvTargetB. The exposure difference correcting gain corrGainA increases from the center portion of the sensor A toward the peripheral portion in proportion of a distance r from the center portion, and the exposure difference correcting gain corrGainB decreases from the center portion of the sensor B to the peripheral portion in peripheral portion to a distance r from the center portion.

FIG. 14B is a diagram in which the inclinations of the exposure difference correcting gains corrGainA and corrGainB in the respective sensors A and B are indicated by arrows. In this way, since the actual partial images 0 and 1 have circular shapes, the straight line 401 is a conical concave in the sensor A, and the straight line 401 is a conical convex in the sensor B. In other words, if the distance r from the center is the same, the exposure difference correcting gains corrGainA and corrGainB are concentrically arranged.

FIG. 14C is an exemplary diagram for schematically describing correction of the luminance with the exposure difference correcting gains corrGainA and corrGainB. The partial image 0 captured by the sensor A is corrected with corrGainA, and the partial image 1 captured by the sensor B is corrected with corrGainB. When it is assumed that pixels having a distance r from the centers of the partial images 0 and 1 be partial images $0(r)$ and $1(r)$, the corrected partial images 0 and 1 can be expressed as follows.

Partial image $0(r)$=partial image $0(r)\times(r/P)\times(1/2)\times\{2^{\wedge}(\text{EvTargetA}-\text{EvTargetB})\}$=partial image $0(r)\times(r/P)\times\{2^{\wedge}(\text{EvCaptureA}-\text{EvCaptureB})\}$ partial image $1(r)$= partial image $1(r)\times\{(P-r)/P\}\times(1/2)\times\{2^{\wedge}(\text{EvTargetA}-\text{EvTargetB})\}$=partial image $1(r)\times\{(P-r)/P\}\times\{2^{\wedge}(\text{EvCaptureA}-\text{EvCaptureB})\}$ In this way, by gradually changing the exposure difference correcting gains corrGainA and corrGainB from the center portions of the partial images 0 and 1 of the sensors A and B and making the luminances of the partial images 0 and 1 of the both sensors A and B coincide with each other at a boundary between the partial images 0 and 1, a difference in the luminance at the boundary can be eliminated.

Regarding both the sensors A and B, since it is preferable to apply the gain in the direction to brighten the partial image, such an application of the gain can be implemented by amplifying a signal. Conversely, to apply a gain in the direction to darken the image, a saturated region of the image cannot be easily corrected.

This is because luminance information of an original object in the saturated region of the image is lost and the degree of darkness cannot be found in a case where the image is darkened by the gain. When the image is brightened by the gain, there is less disadvantage since the image is saturated even when the saturated region is brightened. For this reason, it is not preferable to apply a negative gain to darken the image as an exposure difference correcting gain.

In the present embodiment, as illustrated in FIG. 14C, desired exposure difference correction can be implemented without using a negative gain. That is, the image is captured to be dark by consciously decreasing the capturing exposure EvCaptureB to be smaller than the original target exposure EvTargetB of the sensor B, and a gain is applied to brighten the image from the peripheral portion of the sensor B toward the center portion. In the center portion of the sensor B, the initial target exposure EvTargetB coincides with the luminance in a state where the image is brightly corrected with the exposure difference correcting gain corrGainB.

At the boundary between the sensors A and B, although the exposure difference correcting gain corrGainA is applied to the peripheral portion of the sensor B, the exposure difference correcting gain corrGainB is not applied to the peripheral portion of the sensor B after the image has been captured with dark exposure (not changed before and after correction). Therefore, the luminances of the partial images 0 and 1 are the same.

Accordingly, when the images of the sensors A and B having different sensitivity differences are connected, a difference in the brightness does not occur in the connected portion, and the excellent exposure can be achieved.

<Modification>

Figure 15A:
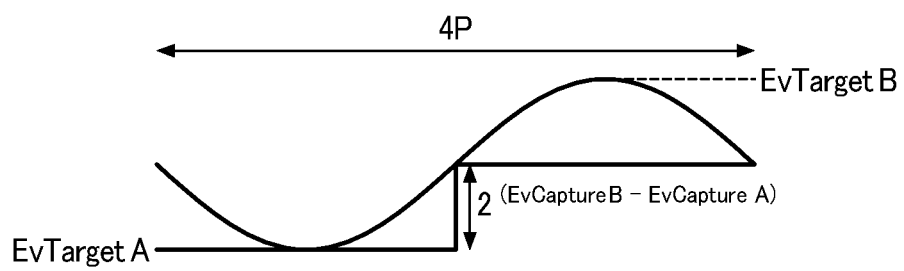
FIGS. 15A and 15B are diagrams for describing a modification of the exposure difference correcting gains corrGainA and corrGainB.

A modification of the exposure difference correcting gains corrGainA and corrGainB will be described with reference to FIGS. 15A and 15B. FIG. 15A illustrates exposure difference correcting gains corrGainA and corrGainB that change in a curved manner in the radial direction. The exposure difference correcting gain corrGainA in FIG. 15B gradually increases in the vicinity of the center of the sensor A, and inclination becomes larger in the peripheral portion.

The exposure difference correcting gain corrGainB gradually decreases in the vicinity of the center of the sensor B, and inclination becomes larger in the peripheral portion. Even with such exposure difference correcting gains corrGainA and corrGainB, an effect similar to that of the present embodiment can be obtained. Furthermore, since the change in the luminance in the center portions of the partial images 0 and 1 becomes gentle, a sense of discomfort can be reduced.

Specifically, the exposure difference correcting gain corrGainA is a sine curve with an amplitude of $2^{\wedge}(\text{EvTargetA}-\text{EvTargetB})$, and a phase is within a range of $\pi$ to two $\pi$. If the radius P corresponds a range from $3\pi/2$ to two $\pi$ (or $3\pi/2$ to $\pi$), an exposure difference correcting gain at an arbitrary distance r can be calculated.

The exposure difference correcting gain corrGainB is a sine curve with an amplitude of 2^(EvTargetA−EvTargetB), and a phase is within a range of zero to π. If the radius P corresponds a range from π/2 to π (or π/2 to zero), an exposure difference correcting gain at an arbitrary distance r can be calculated. In addition, the interpolation can be made by a function with a shape having a convex such as a quadratic equation and a quartic equation.

Figure 15B:
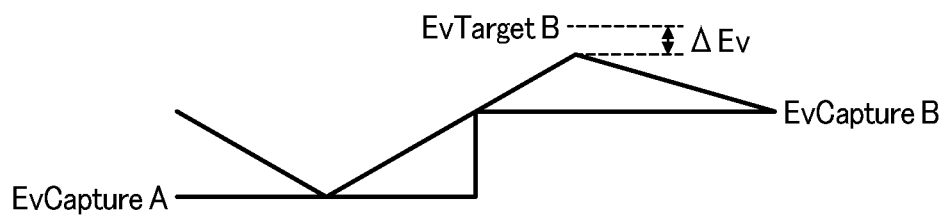

FIG. 15B is an exemplary diagram of the exposure difference correcting gain corrGainB of which a peak is smaller than EvTargetB by ΔEV. That is, the correction unit 36 reduces a correction amount without correcting the luminance to the target exposure EvTargetB in the center portion of the sensor B. ΔEV is several to several ten percent of EvTargetB.

Accordingly, since the inclinations of the exposure difference correcting gains corrGainA and corrGainB are reduced, the change in the luminance caused by the correction is reduced, and the luminance difference caused by the exposure difference correcting processing can be reduced.

Note that it is possible that the peak of the exposure difference correcting gain corrGainB is larger than EvTargetB. In this case, although the change in the luminance caused by the correction is increased, an image having more sharpness can be obtained.

In the first embodiment, the capturing exposure EvCaptureB of the brighter sensor B is set to a half of the target exposure EvTargetB. However, in the present embodiment, an omnidirectional imaging device 10 will be described that sets the capturing exposure EvCaptureB of the brighter sensor B to the target exposure EvTargetA of the sensor A. That is, the capturing exposures of the sensors A and B are set to be the same as the larger one of the target exposures of the sensors A and B.

In the present embodiment, components denoted with the same reference numerals have similar functions. Therefore, there is a case where the description of the component that has been described will be omitted and only a different point will be described. Specifically, the hardware configuration diagram, the functional block diagram, and the like of the omnidirectional imaging device 10 may be similar to those according to the first embodiment.

Figure 16:
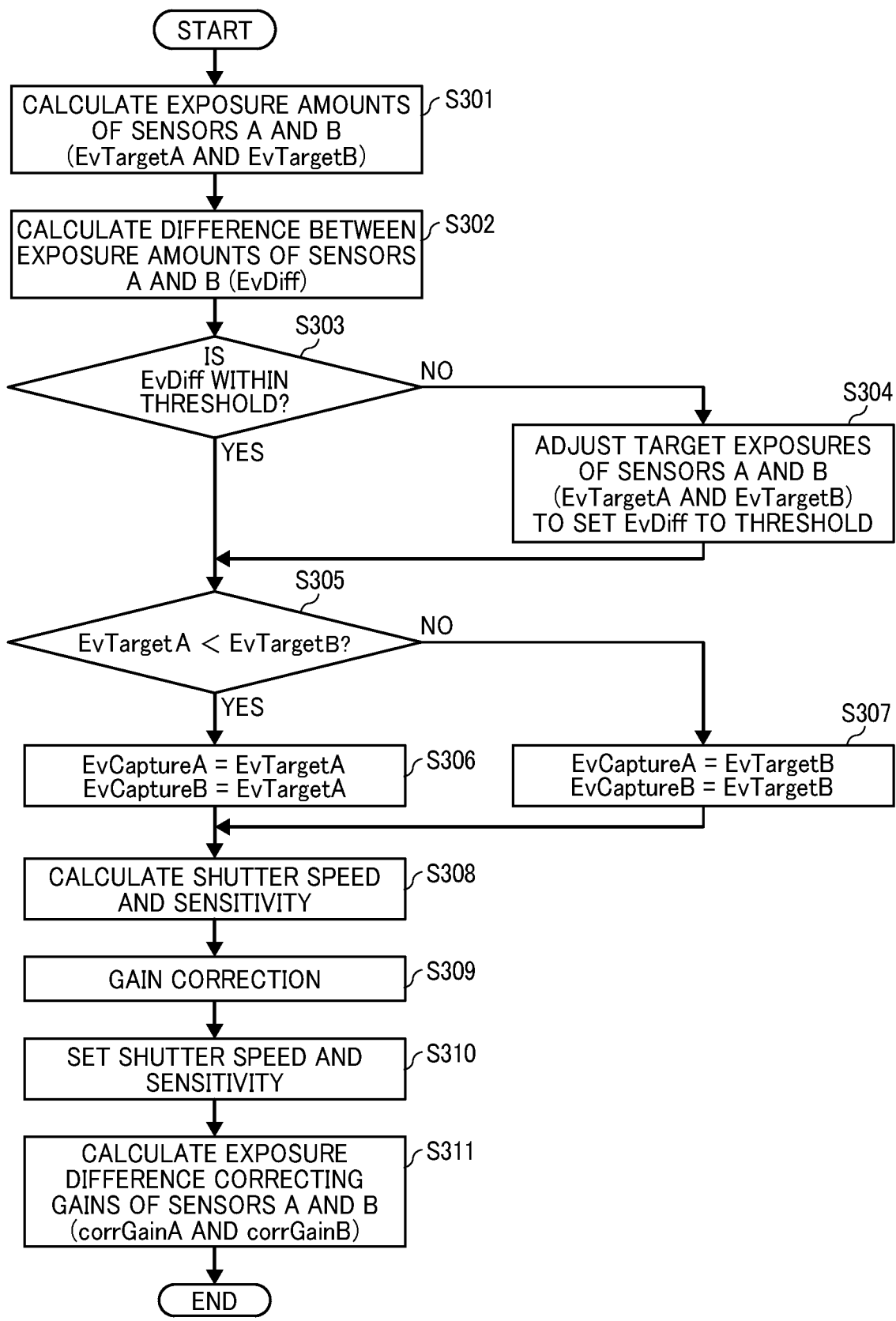
FIG. 16 is an exemplary flowchart of a series of AE processing at the time of still of the imaging device (second embodiment)

FIG. 16 is an exemplary flowchart of a series of AE processing at the time of still of an imaging device according to the present embodiment. In the description of FIG. 16, a difference from FIG. 12 will be described. The processing in steps S301 to S305 may be similar to that in FIG. 12.

In a case where EvTargetA<EvTargetB in step S305, the third exposure amount calculating unit 32 determines the capturing exposure EvCaptureB of the sensor B to the target exposure EvTargetA (step S306). The capturing exposure EvCaptureA of the sensor A may be EvTargetA. That is, both the capturing exposure EvCaptureA of the sensor A and the capturing exposure EvCaptureB of the sensor B are EvTargetA.

Similarly, in a case of EvTargetA≥EvTargetB, the capturing exposure EvCaptureA of the sensor A is determined to the target exposure EvTargetB (step S307). The capturing exposure EvCaptureB of the sensor B may be EvTargetB. That is, both the capturing exposure EvCaptureA of the sensor A and the capturing exposure EvCaptureB of the sensor B are EvTargetB.

The subsequent steps S308 to S311 are similar to those according to the first embodiment in FIG. 12. The method for calculating the exposure difference correcting gains corrGainA and corrGainB in step S311 is different from that in the first embodiment. This will be described with reference to FIGS. 17A and 17B.

Figure 17A:
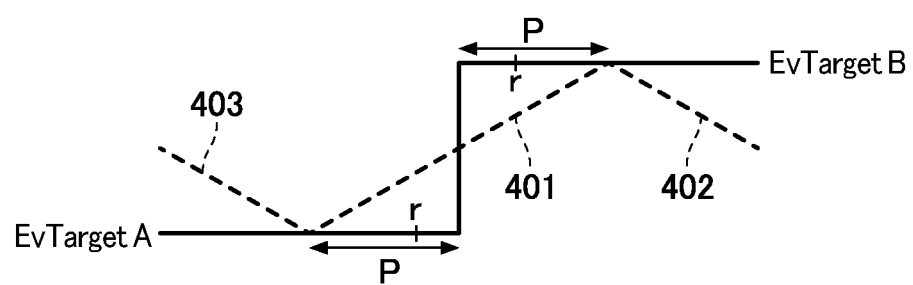
FIGS. 17A and 17B are exemplary diagrams for describing a method for calculating the exposure difference correcting gains corrGainA and corrGainB.
Figure 17B:
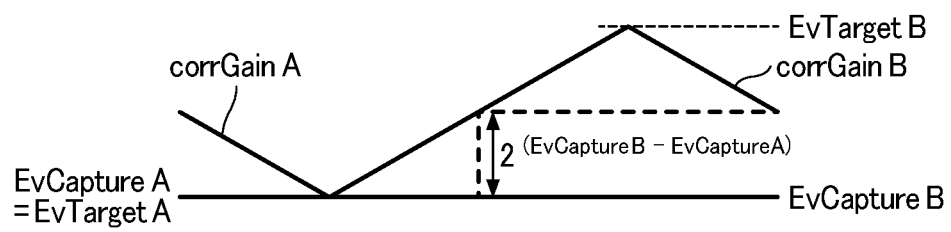

FIGS. 17A and 17B are exemplary diagrams for describing the method for calculating the exposure difference correcting gains corrGainA and corrGainB. FIG. 17A is the same as FIG. 14A, and a method for obtaining the straight line 401 may be the same as that in FIG. 14A. Therefore, the inclinations of corrGainA and corrGainB are the same as those in the first embodiment.

However, in the present embodiment, since the capturing exposure EvCaptureB of the sensor B is the same as the target exposure EvTargetA, a correction amount is increased correspondingly. Specifically, corrGainA of the sensor A is the same as that in the first embodiment, and a formula for correcting the partial image 0 is as follows.

Partial image 0(r)×(r/P)×{2(EvCaptureA−EvCaptureB)} Whereas, since corrGainB of the sensor B is raised by 2^(EvTargetA−EvTargetB), a formula for correcting the partial image 1 is as follows. Partial image 1=partial image 1(r)×[{(P−r)/P}×{2(EvCaptureA−EvCaptureB)}+2^(EvCaptureA−EvCaptureB)] That is, the partial image 1 is multiplied by corrGainB that is increased by half of a difference of 2^(EvTargetA−EvTargetB).

In this way, an effect similar to that in the first embodiment can be obtained by correcting the brighter partial image 1 more largely than the first embodiment.

That is, the image is captured to be dark by making the capturing exposure EvCaptureB be the same as the capturing exposure EvCaptureA of the sensor A with respect to the original target exposure EvTargetB of the sensor B, and the correction unit 36 applies a gain to brighten the image from the peripheral portion of the sensor B toward the center portion. In the center portion of the sensor B, the initial target exposure EvTargetB coincides with the luminance in a state where the image is brightly corrected with the exposure difference correcting gain corrGainB.

At the boundary between the sensors A and B, the exposure difference correcting gain corrGainA is applied to the peripheral portion of the sensor A, and a similar extent of the exposure difference correcting gain corrGainB is applied to the peripheral portion of the sensor B. Therefore, the luminances of the partial images 0 and 1 are the same.

<Modification>

In the present embodiment, the exposure difference correcting gains corrGainA and corrGainB may be curved lines. Furthermore, the maximum value of the exposure difference correcting gain corrGainB may be smaller or larger than the target exposure EvTargetB.

Figure 18A:
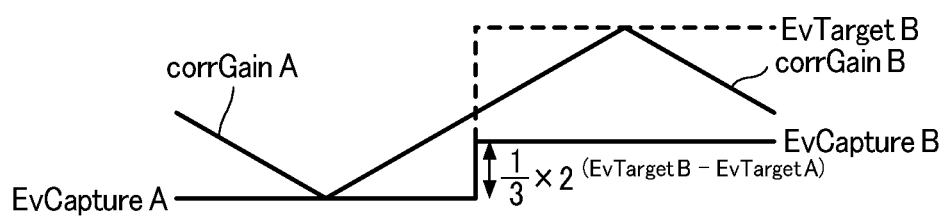
FIGS. 18A and 18B are diagrams for describing a modification of the exposure difference correcting gains corrGainA and corrGainB (second embodiment)
Figure 18B:
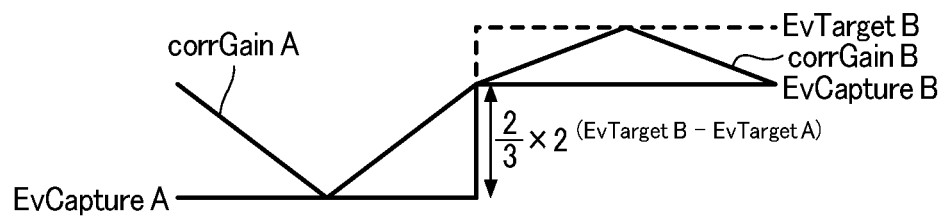

As illustrated in FIG. 18A, the capturing exposure EvCaptureB may be ⅓ of "EvTargetB−EvTargetA". As illustrated in FIG. 18B, the capturing exposure EvCaptureB may be ⅔ of "EvTargetB−EvTargetA".

However, if the capturing exposure EvCaptureB is larger than (EvTargetB−EvTargetA)/2 in the first embodiment, a correction amount of a sensor A is increased. Therefore, there is a possibility that a change in a luminance in the partial image 0 is increased, and it is preferable that the capturing exposure EvCaptureB is set to be equal to or less than half of (EvTargetB−EvTargetA).

In the present embodiment, for description, the exposure difference correction has been described in a case where it is assumed that the object having completely uniform luminance is imaged by adding an exposure difference. However, the luminance of the actual object is not uniform. Therefore, there is a difference between the luminance of the sensor A and the luminance of the sensor B. The concept of correction in a case where there is a difference in the luminance will be described.

FIGS. 19A to 19G are diagrams for describing a conventional correcting method and a correcting method according to the present embodiment of the object having the luminance difference.

Figure 19A:
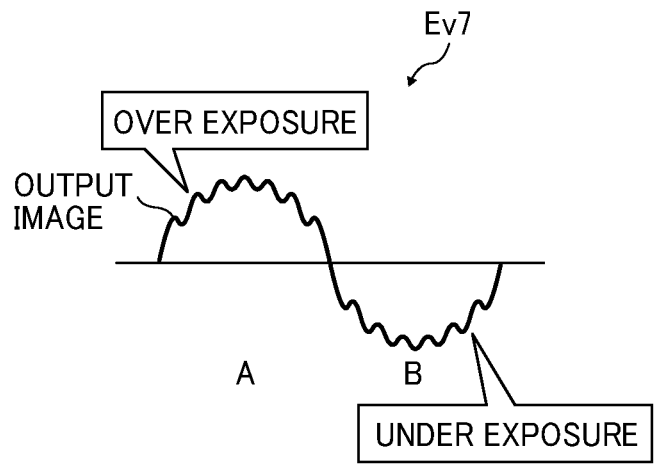
FIGS. 19A to 19G are diagrams for describing a conventional correcting method and a correcting method according to the present embodiment of an object having a luminance difference. The accompanying drawings are intended to depict embodiments of the present disclosure and should not be interpreted to limit the scope thereof. The accompanying drawings are not to be considered as drawn to scale unless explicitly noted.

FIG. 19A illustrates output images in a case where the object having the luminance difference is imaged by the sensors A and B with the same exposure. Due to the luminance difference, the output image of the sensor A is over-exposed, and the output image of the sensor B is under-exposed. Note that it is assumed that the exposure at the time of imaging be EV7.

Figure 19B:
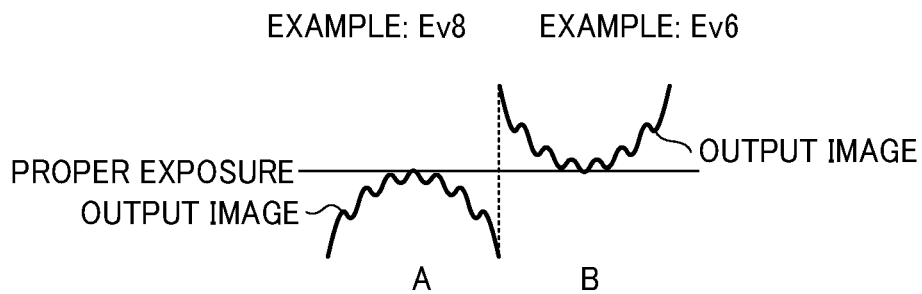

FIG. 19B illustrates exposure amounts in a case where it is desired to reduce the overexposure and the underexposure. As an example, it is assumed that the exposure of the sensor A is EV8 and the exposure of the sensor B is EV6. The exposure of the image output of the sensor A in a case where the image is captured with EV8 is smaller than a proper exposure, and the exposure of the image output of the sensor B in a case where the image is captured with EV6 is larger than the proper exposure.

Figure 19C:
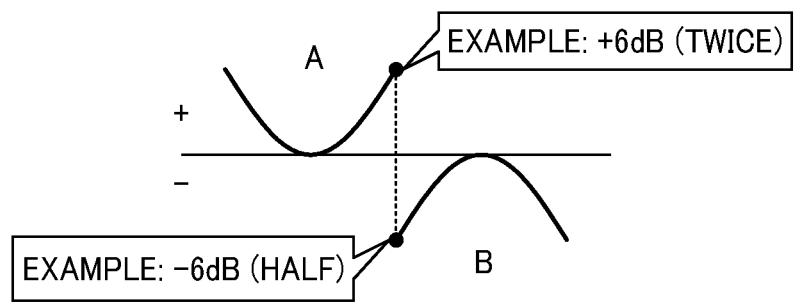

Therefore, the output image is corrected by applying a gain as illustrated in FIG. 19C. A positive gain that gradually increases from the center to the peripheral portion is applied to the output image of the sensor A (for example, +6 dB: twice), and a negative gain that gradually decreased from the center to the peripheral portion is applied to the output image of the sensor B (for example, −6 dB: ½).

Figure 19D:
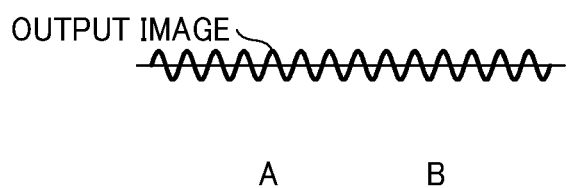

Accordingly, as illustrated in FIG. 19D, both the sensors A and B can capture images with exposure close to the proper exposure.

However, if the negative gain is applied as in FIG. 19C, a disadvantage occurs in a saturated region.

Figure 19E:
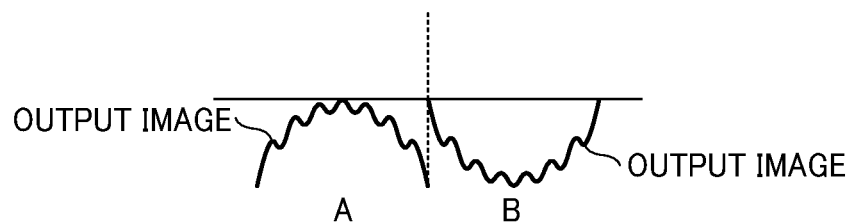

Therefore, in the present embodiment, as illustrated in FIG. 19E, the image is captured while maintaining the exposure of the sensor B to be underexposure. For example, if the sensor B captures an image with EV7, the output image remains to be underexposed.

Figure 19F:
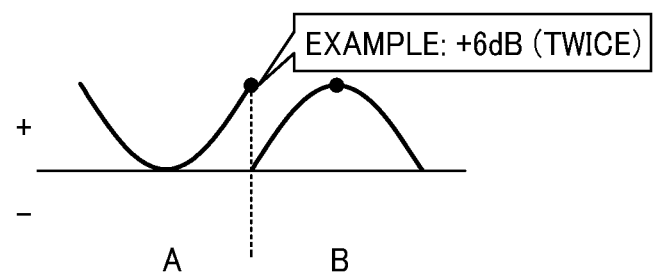
Figure 19G:
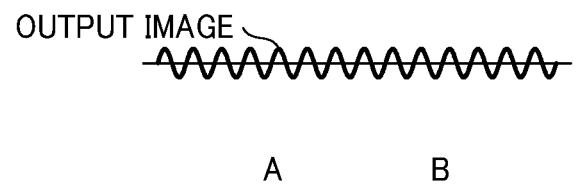

FIG. 19F schematically illustrates the gains according to the present embodiment. The gain of the sensor B is a positive gain that gradually decreases from the center to the peripheral portion. Accordingly, as illustrated in FIG. 19G, both the sensors A and B can capture images with exposure close to the proper exposure. In addition, a negative gain is not used.

<Other Application Examples>

The best modes for carrying out the present disclosure have been described above by using the embodiments. However, the present disclosure is not limited to the embodiments and may be variously modified and replaced without departing from the scope of the present disclosure.

For example, in the present embodiment, the omnidirectional imaging device 10 performs the image processing as a single unit. However, an information processing device of which a function for imaging an omnidirectional image is externally attached can perform image processing. For example, the information processing device is a personal computer, a smartphone, a tablet computer, and the like. Alternatively, the omnidirectional imaging device 10 may referred to as an information processing device incorporating an imaging function.

Furthermore, a plurality of devices may communicate with each other to implement the image processing according to the present embodiment. For example, the omnidirectional imaging device 10 communicates with a server, captures an image, and calculates the exposure difference correcting gain, and the server corrects the exposure difference. In this way, the image processing according to the present embodiment can be constructed as an information processing system implemented by a plurality of devices in cooperation.

Furthermore, in the present embodiment, the correction at the time when the two partial images 0 and 1 are connected to image an omnidirectional image has been described. However, the present embodiment can be applied to a case where three or more partial images are connected to each other. Furthermore, the partial image to be connected does not need to construct the omnidirectional image.

The first exposure amount calculating unit 31 is an example of a first exposure amount calculating unit, the second exposure amount calculating unit 33 is an example of a second exposure amount calculating unit, the third exposure amount calculating unit 32 is an example of a third exposure amount determining unit, the correction gain calculating unit is an example of a correction gain calculating unit, the photographing processing unit 34 is an example of a photographing processing unit, and the correction unit 36 is an example of an image correction unit. The sensor A is an example of a first imaging element, the sensor B is an example of a second imaging element, corrGainA is an example of a first correction gain, the corrGainB is an example of a second correction gain, a first partial image is an example of the partial image 0, and a second partial image is an example of the partial image 1. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An imaging device that connects partial images and forms and outputs a single image, the imaging device comprising:
   a first imaging element that captures a first partial image;
   a second imaging element that captures a second partial image; and
   processing circuitry configured to
      determine a first exposure amount that is a target exposure amount of the first imaging element;
      determine a second exposure amount that is a target exposure amount of the second imaging element;
      reduce the larger one of the first exposure amount and the second exposure amount;
      determine a third exposure amount having the reduced larger one of the first exposure amount and the second exposure amount;
      calculate a first correction gain used to correct the first partial image and a second correction gain used to correct the second partial image based on the first exposure amount and the second exposure amount;
      control an imaging element, having a smaller one of the first exposure amount and the second exposure amount, to capture an image with the target exposure amount of the imaging element, the imaging element being one of the first imaging element and the second imaging element;
      control another imaging element, having a larger one of the first exposure amount and the second exposure amount, to capture another image with the third exposure amount, said another imaging element being the other of the first imaging element and the second imaging element; and
      correct the first partial image with the first correction gain and correct the second partial image with the second correction gain.

2. The imaging device according to claim 1, wherein the processing circuitry determines the third exposure amount by reducing the larger one of the first exposure amount and the second exposure amount to equal to or less than half of a difference between the first exposure amount and the second exposure amount while the smaller one of the first exposure amount and the second exposure amount is set to a lower limit.

3. The imaging device according to claim 1, wherein the processing circuitry determines the third exposure amount by reducing the larger one of the first exposure amount and the second exposure amount to be the same as the smaller one of the first exposure amount and the second exposure amount.

4. The imaging device according to claim 1, wherein
   the first partial image and the second partial image have circular shapes,
   a correction gain of the imaging element having the smaller one of first exposure amount and the second exposure amount gradually and concentrically increases from a center portion to a peripheral portion of the partial image captured by the imaging element having the smaller one, and
   a correction gain of the imaging element, having the larger one of the first exposure amount and the second exposure amount, gradually and concentrically decreases from the center portion to the peripheral portion such that a luminance in the center portion of the partial image captured by the imaging element having the larger one of the first exposure amount and the second exposure amount is about the same as a luminance captured with the target exposure amount of the imaging element having the larger one of the first exposure amount and the second exposure amount, the correction gain being one of the first correction gain and the second correction gain.

5. The imaging device according to claim 4, wherein the processing circuitry is further configured to
   calculate, as the correction gain of the image element having the smaller one of first exposure amount and the second exposure amount, a first gain that gradually and concentrically increases from the center portion toward the peripheral portion of the partial image such that a luminance of the peripheral portion of the partial image captured by the imaging element having the smaller one of the first exposure amount and the second exposure amount is higher than a luminance in the center portion of the partial image captured by the imaging element having the smaller one, by a half of a difference between a luminance captured with the first exposure amount and a luminance captured with the second exposure amount; and
   calculate, as the correction gain of the image element having the larger one of first exposure amount and the second exposure amount, a second gain that gradually and concentrically decreases from the center portion toward the peripheral portion of the partial image captured by the imaging element having the larger one of the first exposure amount and the second exposure amount such that a luminance of the peripheral portion of the partial image captured by the imaging element having the smaller one is lower than a luminance in the center portion of the partial image captured by the imaging element having the smaller one, by a half of a difference between a luminance captured with the first exposure amount and a luminance captured with the second exposure amount.

6. The imaging device according to claim 4, wherein the processing circuitry is further configured to
   calculate a first gain that concentrically increases toward the peripheral portion in proportion to a distance from a center portion of the partial image captured by the imaging element having the smaller one of the first exposure amount and the second exposure amount as the correction gain of the imaging element having the smaller one of the first exposure amount and the second exposure amount; and
   calculate a second gain that concentrically decreases toward the peripheral portion in proportion to the distance from the center portion of the partial image captured by the imaging element having the larger one of the first exposure amount and the second exposure amount, as the correction gain of the imaging element having the larger one of the first exposure amount and the second exposure amount.

7. The imaging device according to claim 4, wherein the processing circuitry is further configured to
   calculate a first gain that gently increases in vicinity of the center portion and significantly increases in the peripheral portion of the partial image captured by the imaging element having the smaller one of the first exposure amount and the second exposure amount; and
   calculate a second gain that gently decreases in the vicinity of the center portion and significantly decreases in the peripheral of the partial image captured by the imaging element having the larger one of the first exposure amount and the second exposure amount.

8. The imaging device according to claim 1, wherein the processing circuitry is further configured to
set the smaller one of the first exposure amount and the second exposure amount as the third exposure amount,
calculate a first gain that is not applied to the center portion of the partial image captured by the imaging element having the smaller one of the first exposure amount and the second exposure amount, and that gradually and concentrically increases from the center portion to the peripheral portion of the partial image, as the correction gain of the imaging element having the smaller one of the first exposure amount and the second exposure amount; and
calculate a second gain that is the largest gain applied to the center portion of a partial image captured by the imaging element having the larger one of the first exposure amount and the second exposure amount, and that gradually and concentrically decreases from the center portion to the peripheral portion of the partial image, as the correction gain of the imaging element having the larger one of the first exposure amount and the second exposure amount, the gain in the peripheral portion of the partial image captured by the imaging element having the larger one being equal to the gain of the peripheral portion with the correction gain of the imaging element having the smaller one of the first exposure amount and the second exposure amount.

9. An information processing system that connects a plurality of partial images and forms and outputs a single image, the information processing system comprising:
a first imaging element that captures a first partial image;
a second imaging element that captures a second partial image; and
a first exposure amount calculating circuitry configured to determine a first exposure amount that is a target exposure amount of the first imaging element;
a second exposure amount calculating circuitry configured to determine a second exposure amount that is a target exposure amount of the second imaging element;
a third exposure amount determining circuitry configured to reduce the larger one of the first exposure amount and the second exposure amount and determine a third exposure amount having the reduced larger one of the first exposure amount and the second exposure amount;
a correction gain calculating circuitry configured to calculate a first correction gain used to correct the first partial image and a second correction gain used to correct the second partial image based on the first exposure amount and the second exposure amount;
a photographing processing circuitry configured to
control an imaging element, having a smaller one of the first exposure amount and the second exposure amount, to capture an image with the target exposure amount of the imaging element, the imaging element being one of the first imaging element and the second imaging element, and
control another imaging element, having a larger one of the first exposure amount and the second exposure amount, to capture another image with the third exposure amount, said another imaging element being the other of the first imaging element and the second imaging element; and
an image correction circuitry configured to correct the first partial image with the first correction gain and correct the second partial image with the second correction gain.

10. A non-transitory computer readable storage medium storing a program that causes an information processing device, that connects a plurality of partial images and forms and outputs a single image, to perform a process comprising:
capturing a first partial image;
capturing a second partial image;
determining a first exposure amount that is a target exposure amount at which the first partial image has been captured in the capturing;
determining a second exposure amount that is a target exposure amount at which the second partial image has been captured in the capturing;
reducing a larger one of the first exposure amount and the second exposure amount to determine a third exposure amount having the reduced larger one of the first exposure amount and the second exposure amount;
calculating a first correction gain used to correct the first partial image and a second correction gain used to correct the second partial image, based on the first exposure amount and the second exposure amount;
controlling an imaging element, having a smaller one of the first exposure amount and the second exposure amount, to capture an image with the target exposure amount of the imaging element, the imaging element being one of the first imaging element and the second imaging element;
controlling another imaging element, having a larger one of the first exposure amount and the second exposure amount, to capture another image with the third exposure amount, said another imaging element being the other of the first imaging element and the second imaging element; and
correcting the first partial image with the first correction gain and the second partial image with the second correction gain.

11. An image processing method of an imaging device that connects a plurality of partial images and forms and output a single image, the method comprising:
capturing a first partial image;
capturing a second partial image;
determining a first exposure amount that is a target exposure amount at which the first partial image has been captured in the capturing;
determining a second exposure amount that is a target exposure amount at which the second partial image has been captured in the capturing;
reducing a larger one of the first exposure amount and the second exposure amount to determine a third exposure amount having the reduced larger one of the first exposure amount and the second exposure amount;
calculating a first correction gain used to correct the first partial image and a second correction gain used to correct the second partial image, based on the first exposure amount and the second exposure amount;
controlling an imaging element, having a smaller one of the first exposure amount and the second exposure amount, to capture an image with the target exposure amount of the imaging element, the imaging element being one of the first imaging element and the second imaging element;
controlling another imaging element, having a larger one of the first exposure amount and the second exposure amount, to capture another image with the third exposure amount, said another imaging element being the other of the first imaging element and the second imaging element; and correcting the first partial image with the first correction gain and the second partial image with the second correction gain.

12. The image processing method according to claim 11, to determine the third exposure amount, the reducing includes reducing the larger one of the first exposure amount and the second exposure amount to equal to or less than half of a difference between the first exposure amount and the second exposure amount while the smaller one of the first exposure amount and the second exposure amount is set to a lower limit.

13. The image processing method according to claim 11, to determine the third exposure amount, the reducing includes reducing the larger one of the first exposure amount and the second exposure amount to be the same as the smaller one of the first exposure amount and the second exposure amount.

14. The image processing method according to claim 11, wherein
the first partial image and the second partial image have circular shapes,
a correction gain of the imaging element having the smaller one of first exposure amount and the second exposure amount gradually and concentrically increases from a center portion to a peripheral portion of the partial image captured by the imaging element having the smaller one, and
a correction gain of the imaging element, having the larger one of the first exposure amount and the second exposure amount, gradually and concentrically decreases from the center portion to the peripheral portion such that a luminance in the center portion of the partial image captured by the imaging element having the larger one of the first exposure amount and the second exposure amount is about the same as a luminance captured with the target exposure amount of the imaging element having the larger one of the first exposure amount and the second exposure amount, the correction gain being one of the first correction gain and the second correction gain.

15. The image processing method according to claim 14, further comprising:
calculating, as the correction gain of the image element having the smaller one of first exposure amount and the second exposure amount, a first gain that gradually and concentrically increases from the center portion toward the peripheral portion of the partial image such that a luminance of the peripheral portion of the partial image captured by the imaging element having the smaller one of the first exposure amount and the second exposure amount is higher than a luminance in the center portion of the partial image captured by the imaging element having the smaller one, by a half of a difference between a luminance captured with the first exposure amount and a luminance captured with the second exposure amount; and
calculating, as the correction gain of the image element having the larger one of first exposure amount and the second exposure amount, a second gain that gradually and concentrically decreases from the center portion toward the peripheral portion of the partial image captured by the imaging element having the larger one of the first exposure amount and the second exposure amount such that a luminance of the peripheral portion of the partial image captured by the imaging element having the smaller one is lower than a luminance in the center portion of the partial image captured by the imaging element having the smaller one, by a half of a difference between a luminance captured with the first exposure amount and a luminance captured with the second exposure amount.

16. The image processing method according to claim 14, further comprising:
calculating a first gain that concentrically increases toward the peripheral portion in proportion to a distance from a center portion of the partial image captured by the imaging element having the smaller one of the first exposure amount and the second exposure amount as the correction gain of the imaging element having the smaller one of the first exposure amount and the second exposure amount; and
calculating a second gain that concentrically decreases toward the peripheral portion in proportion to the distance from the center portion of the partial image captured by the imaging element having the larger one of the first exposure amount and the second exposure amount, as the correction gain of the imaging element having the larger one of the first exposure amount and the second exposure amount.

17. The image processing method according to claim 14, further comprising:
calculating a first gain that gently increases in vicinity of the center portion and significantly increases in the peripheral portion of the partial image captured by the imaging element having the smaller one of the first exposure amount and the second exposure amount; and
calculating a second gain that gently decreases in the vicinity of the center portion and significantly decreases in the peripheral of the partial image captured by the imaging element having the larger one of the first exposure amount and the second exposure amount.

18. The image processing method according to claim 11, further comprising:
setting the smaller one of the first exposure amount and the second exposure amount as the third exposure amount;
calculating a first gain that is not applied to the center portion of the partial image captured by the imaging element having the smaller one of the first exposure amount and the second exposure amount, and that gradually and concentrically increases from the center portion to the peripheral portion of the partial image, as the correction gain of the imaging element having the smaller one of the first exposure amount and the second exposure amount; and
calculating a second gain that is the largest gain applied to the center portion of a partial image captured by the imaging element having the larger one of the first exposure amount and the second exposure amount, and that gradually and concentrically decreases from the center portion to the peripheral portion of the partial image, as the correction gain of the imaging element having the larger one of the first exposure amount and the second exposure amount, the gain in the peripheral portion of the partial image captured by the imaging element having the larger one being equal to the gain of the peripheral portion with the correction gain of the imaging element having the smaller one of the first exposure amount and the second exposure amount.

19. The information processing system according to claim 9, wherein the third exposure amount determining circuitry determines the third exposure amount by reducing the larger one of the first exposure amount and the second exposure amount to equal to or less than half of a difference between the first exposure amount and the second exposure amount while the smaller one of the first exposure amount and the second exposure amount is set to a lower limit.

20. The information processing system according to claim 9, wherein the third exposure amount determining circuitry determines the third exposure amount by reducing the larger one of the first exposure amount and the second exposure amount to be the same as the smaller one of the first exposure amount and the second exposure amount.

* * * * *